US011069328B2

(12) United States Patent
Ebihara et al.

(10) Patent No.: US 11,069,328 B2
(45) Date of Patent: Jul. 20, 2021

(54) INFORMATION PROCESSING APPARATUS, INFORMATION PROCESSING METHOD, AND PROGRAM

(71) Applicant: Sony Corporation, Tokyo (JP)

(72) Inventors: Munetake Ebihara, Tokyo (JP); Kimihiko Kogure, Tokyo (JP); Akira Fujisawa, Tokyo (JP); Ken Kobayashi, Kanagawa (JP); Tomoko Katsuhara, Kanagawa (JP); Tetsuro Goto, Tokyo (JP); Fumiko Shiga, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/632,188

(22) PCT Filed: Jun. 25, 2018

(86) PCT No.: PCT/JP2018/024007
§ 371 (c)(1),
(2) Date: Jan. 17, 2020

(87) PCT Pub. No.: WO2019/017153
PCT Pub. Date: Jan. 24, 2019

(65) Prior Publication Data
US 2020/0168182 A1 May 28, 2020

(30) Foreign Application Priority Data
Jul. 20, 2017 (JP) .............................. JP2017-140970

(51) Int. Cl.
*G06F 3/041* (2006.01)
*G09G 5/38* (2006.01)
(Continued)

(52) U.S. Cl.
CPC .............. *G09G 5/38* (2013.01); *G06F 3/033* (2013.01); *G06F 3/041* (2013.01);
(Continued)

(58) Field of Classification Search
CPC .......... G01R 27/26; G06F 3/041; G06F 3/045
See application file for complete search history.

(56) References Cited

U.S. PATENT DOCUMENTS

2010/0085317 A1    4/2010  Park et al.
2013/0321329 A1*  12/2013  Tokutake ............ G06F 3/04845
                                                    345/174
(Continued)

FOREIGN PATENT DOCUMENTS

JP     2014-142813       8/2014
JP     2014142813  A     8/2014
(Continued)

OTHER PUBLICATIONS

International Search Report for Application No. PCT/JP2018/024007, dated Sep. 11, 2018.

*Primary Examiner* — Pegeman Karimi
(74) *Attorney, Agent, or Firm* — K&L Gates LLP

(57) ABSTRACT

An information processing apparatus according to the present technology includes a housing, a display section, a pressure-sensitive sensor, and a control section. The housing has a front surface and a sub-surface including an operation area and is capable of being held by a user. The display section is arranged on the front surface. The pressure-sensitive sensor detects a pressure value with respect to the sub-surface. The control section identifies a status that the operation area is operated by the user and a status that the operation area is held by the user on the basis of the pressure value, and executes predetermined processing on the basis of an operation by the user with respect to the operation area in a case where the status is determined that the operation area is operated.

16 Claims, 24 Drawing Sheets

(51) Int. Cl.
    *G06F 3/033*     (2013.01)
    *H04M 1/02*     (2006.01)

(52) U.S. Cl.
    CPC .. *H04M 1/0202* (2013.01); *G09G 2340/0464* (2013.01); *G09G 2354/00* (2013.01); *H04M 2250/12* (2013.01)

(56) References Cited

U.S. PATENT DOCUMENTS

| | | | |
|---|---|---|---|
| 2014/0282051 A1* | 9/2014 | Cruz-Hernandez | G06F 3/0488 715/744 |
| 2015/0234581 A1* | 8/2015 | Terrero | G06F 3/04886 715/863 |
| 2016/0062515 A1 | 3/2016 | Bae et al. | |
| 2016/0162241 A1* | 6/2016 | An | H04M 1/0214 345/1.3 |
| 2016/0225346 A1* | 8/2016 | Choi | G06F 1/165 |
| 2017/0003874 A1* | 1/2017 | Grupinski | G06F 3/04883 |
| 2018/0074636 A1* | 3/2018 | Lee | G06F 1/1626 |
| 2018/0150153 A1 | 5/2018 | Yoon et al. | |

FOREIGN PATENT DOCUMENTS

| | | |
|---|---|---|
| JP | 2015-169948 | 9/2015 |
| JP | 2015169948 A | 9/2015 |
| KR | 10-1292719 | 8/2013 |
| KR | 101292719 B1 | 8/2013 |
| WO | 2012044839 A2 | 4/2012 |
| WO | 2016065482 A1 | 5/2016 |
| WO | 2016/204423 | 12/2016 |
| WO | 2016204423 A1 | 12/2016 |

* cited by examiner ns, the control section may cause the display section to newly display the guide on the basis of the user contact position.

INFORMATION PROCESSING APPARATUS, INFORMATION PROCESSING METHOD, AND PROGRAM

TECHNICAL FIELD

The present technology relates to a technology of an information processing apparatus and the like.

BACKGROUND ART

In the related art, in an information processing apparatus such as a smartphone capable of being held by a user, a display is generally arranged only on a front surface of a housing. On the other hand, in recent years, an information processing apparatus having displays arranged not only on the front surface but also on a side surface has been becoming known (for example, see Patent Literature 1 below).

In this kind of the information processing apparatus, a GUI (Graphical User Interface) may be arranged on the display arranged at the side surface. When the user operates the GUI arranged on the side surface by fingers, processing relating to the GUI is executed.

CITATION LIST

Patent Literature

Patent Literature 1: U.S. Unexamined Patent Application Publication No. 2015/0227227

DISCLOSURE OF INVENTION

Technical Problem

Incidentally, the side surface of housing is a portion generally held by the user's fingers. Accordingly, when the user holds the side surface of the housing, it is misrecognized that, for example, the GUI is operated and processing may be undesirably executed against a user's intention.

The present technology is made in view of the above-mentioned circumstances, and it is an object of the present technology to provide a technology that prevents processing from being executed against a user's intention when the user holds a housing.

Solution to Problem

An information processing apparatus according to the present technology includes a housing, a display section, a pressure-sensitive sensor, and a control section.

The housing has a front surface and a sub-surface including an operation area and is capable of being held by a user.

The display section is arranged on the front surface.

The pressure-sensitive sensor detects a pressure value with respect to the sub-surface.

The control section identifies a status that the operation area is operated by the user and a status that the operation area is held by the user on the basis of the pressure value, and executes predetermined processing on the basis of an operation by the user with respect to the operation area in a case where the status is determined that the operation area is operated.

In the information processing apparatus, since it identifies the status that the operation area is operated by the user and the status that the operation area is held by the user on the basis of the pressure value with respect to the sub-surface, the statuses can be accurately identified. Accordingly, it prevents processing against a user's intention from being executed when the user holds the housing.

In the information processing apparatus, the control section may determine that the operation area is operated by the user in a case where it satisfies a condition that the pressure value continues to take a value within a predetermined range within a predetermined time.

In the information processing apparatus, the control section may determine that the operation area is held by the user in a case where the condition is not satisfied.

The information processing apparatus may include a plurality of the pressure-sensitive sensors, and the control section may identify a status that the operation area is operated by the user and the operation area is held by the user on the basis of a second pressure value detected by a second pressure-sensitive sensor adjacent to a first pressure-sensitive sensor in a case where it satisfies a condition that a first pressure value detected by the first pressure-sensitive sensor of the plurality of pressure-sensitive sensors continues to take a value within a predetermined range within a predetermined time.

In the information processing apparatus, the control section may determine that the operation area is in a status operated by the user in a case where the second pressure value is less than a predetermined threshold.

In the information processing apparatus, the control section may determine that the operation area is in a status held by the user in a case where the second pressure value is a predetermined threshold or more.

In the information processing apparatus, the control section may determine a position in which the operation area is set in the sub-surface.

The information processing apparatus further includes a motion sensor that detects a posture of the housing, and the control section may determine a position in which the operation area is set on the basis of the detected posture of the housing.

In the information processing apparatus, the control section may determine a holding pattern of the housing held by the user on the basis of the pressure value and determine a position in which the operation area is set on the basis of the holding pattern.

In the information processing apparatus, when the posture of the housing is changed, the control section may newly determine a position in which the operation area is set at the sub-surface on the basis of a change in the posture.

In the information processing apparatus, when the holding pattern is changed, the control section may newly determine a position in which the operation area is set at the sub-surface on the basis of a change in the holding pattern.

In the information processing apparatus, when the operation area is set at the sub-surface, the control section may cause a guide showing a position in which the operation area is set to be displayed on the display section at the front surface.

In the information processing apparatus, the display sections may be arranged on the front surface and the sub-surface, and the control section may cause a GUI (Graphical User Interface) to be displayed at a position corresponding to the operation area on the sub-surface of the display section.

In the information processing apparatus further includes a proximity sensor arranged on the sub-surface that detects a user contact position, and in a case where the status is determined that the operation area is operated by the user, the control section may execute predetermined processing on the basis of the detected contact position.

In the information processing apparatus, in a case where the status is determined that the operation area is operated by the user, the control section may execute predetermined processing on the basis of the pressure value.

In the information processing apparatus, the housing may have a shape changeable between an expanded status and a folded status.

An information processing method according to the present technology includes identifying, on the basis of a pressure value with respect to a sub-surface of a housing having a front surface including a display section and the sub-surface including an operation area, the housing being capable of being held by a user, a status that the operation area is operated by the user and a status that the operation area is held by the user; and executing predetermined processing on the basis of an operation by the user with respect to the operation area in a case where the status is determined that the operation area is operated.

A program executed by a computer according to the present technology, the program causing the computer to do steps of identifying, on the basis of a pressure value with respect to a sub-surface of a housing having a front surface including a display section and the sub-surface including an operation area, the housing being capable of being held by a user, a status that the operation area is operated by the user and a status that the operation area is held by the user; and executing predetermined processing on the basis of an operation by the user with respect to the operation area in a case where the status is determined that the operation area is operated.

Advantageous Effects of Invention

As described above, according to the present technology, there can be provided a technology that prevents processing from being executed against a user's intention when the user holds a housing.

MODE(S) FOR CARRYING OUT THE INVENTION

Hereinafter, embodiments of the present disclosure will be described with reference to the drawings.

First Embodiment

[Overall Configuration and Configuration of Each Component of Smartphone 100]

Figure 1:
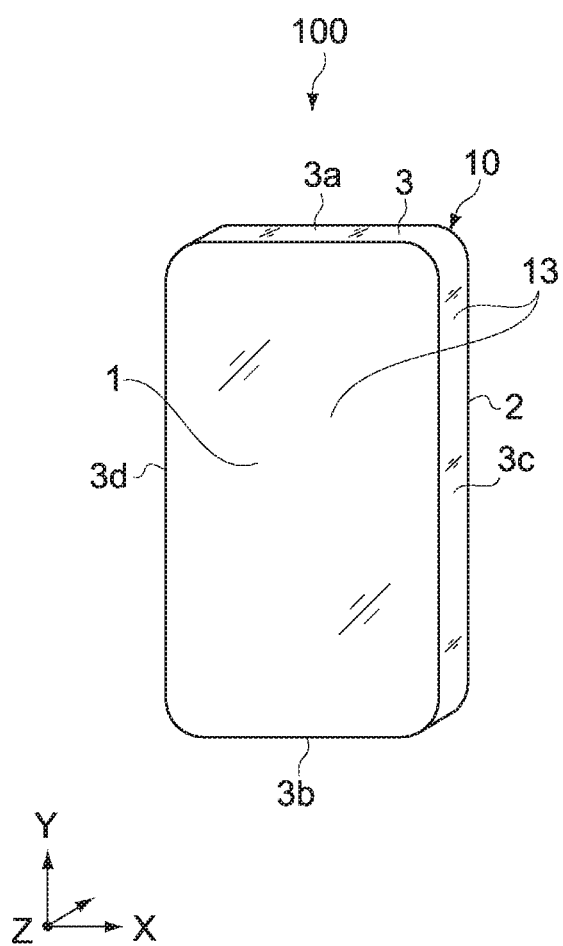
FIG. 1 is a perspective view showing a smartphone according to a first embodiment of the present technology.

FIG. 1 is a perspective view showing a smartphone 100 (information processing apparatus) according to a first embodiment of the present technology. As shown in FIG. 1, the smartphone 100 according to this embodiment includes a housing 10 and display sections 13 arranged on surfaces of the housing 10.

The housing 10 has a size of capable of being held by a user's hand. The housing 10 has a rectangular parallelepiped and is thin in the thickness direction (Z axis direction), short in the shorter direction (X axis direction), and long in the longer direction (Y axis direction).

The housing 10 has a front surface 1, a rear surface 2, and a side circumference surface 3 (sub-surface). The side circumference surface 3 has four surfaces: an upper surface 3a (sub-surface), a lower surface 3b (sub-surface), a right side surface 3c (sub-surface), and a left side surface 3d (sub-surface). Note that, in the present specification, the four surfaces of the side circumference surface 3, i.e., an upper side surface, an lower side surface, a right side surface, and a left side surface are set to the upper surface 3a, the lower surface 3b, the right side surface 3c, and the left side surface 3d (i.e., same surface may be differently referred) on the basis of the gravity direction.

Note that the housing 10 includes an earpiece, a mouthpiece, a connector, and the like (not shown).

The display sections 13 include, for example, a liquid crystal display, an EL (Electro-Luminescence) display, and the like. The display sections 13 are arranged on the entire front surface 1 of the housing 10 and are also arranged on the entire side circumference surface 3 of the housing 10.

Note that, in this embodiment, although one display section 13 is arranged on the entire side circumference surface 3 of the housing 10, it is possible to arrange the display section 13 only on a part of the side circumference surface 3 of the housing 10 (e.g., display section 13 is arranged only on the right side surface 3c). In addition, in this embodiment, although no display section 13 is arranged on the rear surface 2, it is possible to arrange the display section 13 on the rear surface 2.

Figure 2:
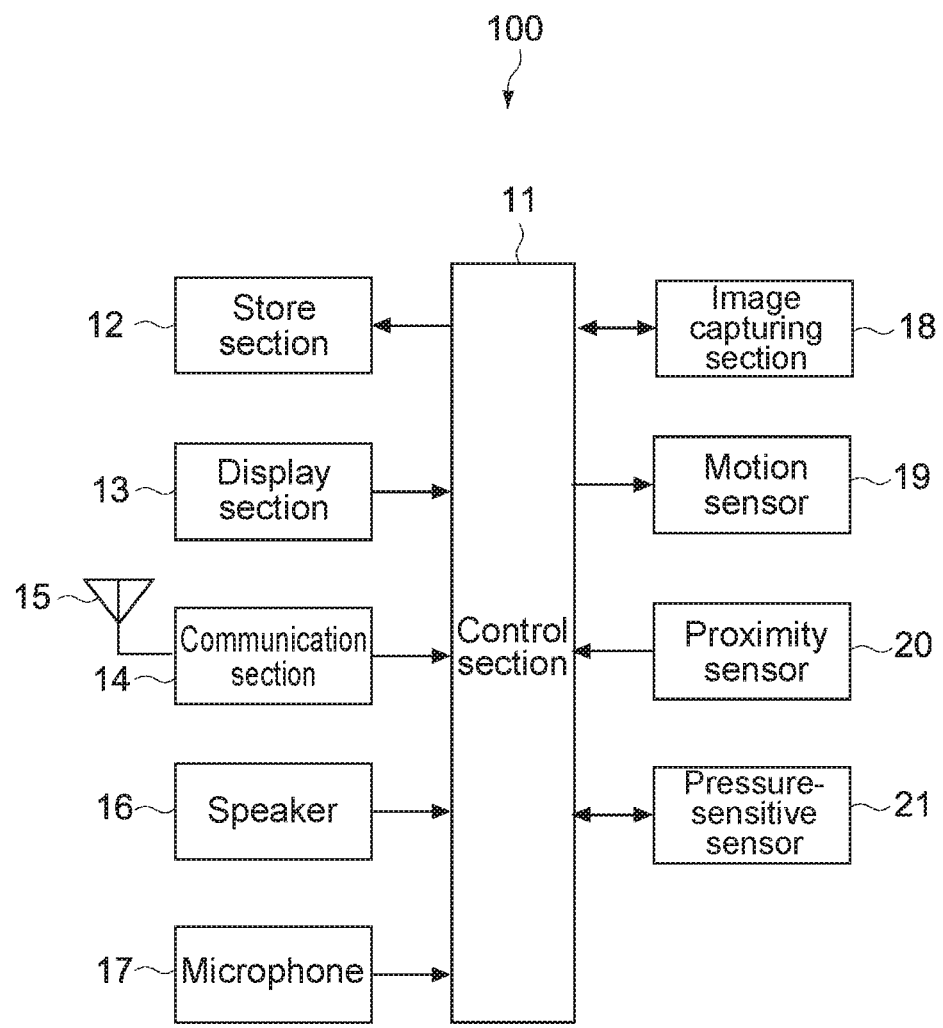
FIG. 2 is a block diagram showing an electrical configuration of the smartphone.

FIG. 2 is a block diagram showing an electrical configuration of the smartphone 100. As shown in FIG. 2, the smartphone 100 includes a control section 11, a store section 12, a display section 13, a communication section 14, an antenna 15, a speaker 16, a microphone 17, an image capturing section 18, a motion sensor 19, a proximity sensor 20, and a plurality of pressure-sensitive sensors 21.

The control section 11 includes, for example, a CPU (Central Processing Unit) or the like. The control section 11 executes a variety of calculations on the basis of a variety of programs stored in the store section 12, and integrally controls respective components of the smartphone 100. Specific processing of the control section 11 will be described later in detail.

The store section 12 includes a volatile memory used for a work area of the control section 11 and a non-volatile memory in which the variety of programs necessary for the processing of the control section 11 are stored. The variety of the programs may be read from a portable recording medium such as an optical disc and a semiconductor memory or may be downloaded from a server apparatus on a network.

The communication section 14 executes processing such as conversion, modulation, and demodulation of a frequency of a radio wave transmitted and received by the antenna 15. The antenna 15 transmits and receives a radio wave for calling and a radio wave for packet communication such as an e-mail and Web data.

The speaker 16 includes a digital/analog convertor, an amplifier, and the like. The speaker 16 executes digital/analog conversion processing and amplification processing with respect to voice data for calling input from the control section 11, and outputs a voice via the earpiece.

The microphone 17 includes an analog/digital convertor and the like. The microphone 17 converts analog voice data input from a user via the mouthpiece into digital voice data and outputs it to the control section 11. The digital voice data output to the control section 11 is encoded and then transmitted via the communication section 14 and the antenna 15.

The image capturing section 18 includes an optical system such as an objective lens and an image capturing lens and an image capturing device such as a CMOS (Complementary Metal Oxide Semiconductor) sensor and a CCD (Charge Coupled Device) sensor that convert light taken through the optical system. The image capturing section 18 generates image data from a signal image-captured by an image capturing device and feeds it to the control section 11.

The motion sensor 19 detects a movement and a posture of the housing 10. Examples of the motion sensor 19 includes an acceleration sensor, an angular velocity sensor, a magnetic field sensor, an atmospheric sensor, and the like (two or more of them may be combined).

The proximity sensor 20 is arranged on the surface of the housing 10 (on display sections 13) and detects proximity of a user's hand with respect to the surface of the housing 10. The proximity sensor 20 is arranged on the entire front surface 1 of the housing 10 and is also arranged on the entire side circumference surface 3 of the housing 10. As the proximity sensor 20, an electrostatic capacitance type sensor or a resistive membrane type sensor is used, for example. Any type of the proximity sensor 20 may be used.

Each of the plurality of pressure-sensitive sensors 21 detects a pressure value of the user's hand with respect to the side circumference surface 3 of the housing 10. As the pressure-sensitive sensor 21, the electrostatic capacitance type sensor, a coil type sensor, or the like is used, for example. Any type of the pressure-sensitive sensor 21 may be used.

Figure 3:
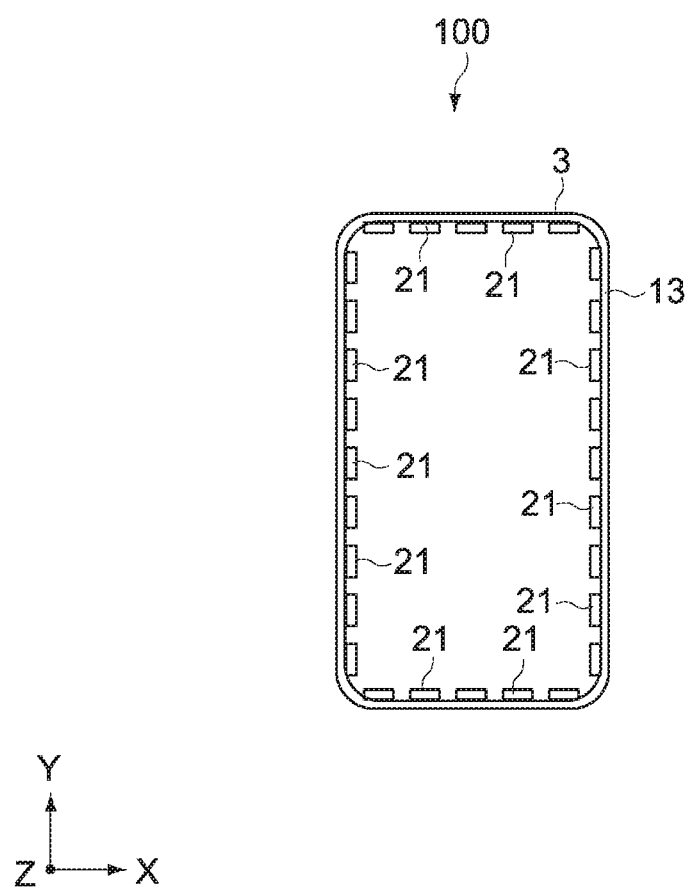
FIG. 3 is a view showing positions in which a plurality of pressure-sensitive sensors is arranged.

FIG. 3 is a view showing positions in which the plurality of pressure-sensitive sensors 21 is arranged. As shown in FIG. 3, the plurality of pressure-sensitive sensors 21 is arranged on the entire side circumference surface 3 of the housing 10. Specifically, the plurality of pressure-sensitive sensors 21 is arranged on positions inside the display section 13 at predetermined intervals.

<Working Description>
[Setting Processing of Operation Area 5]

Figure 4:
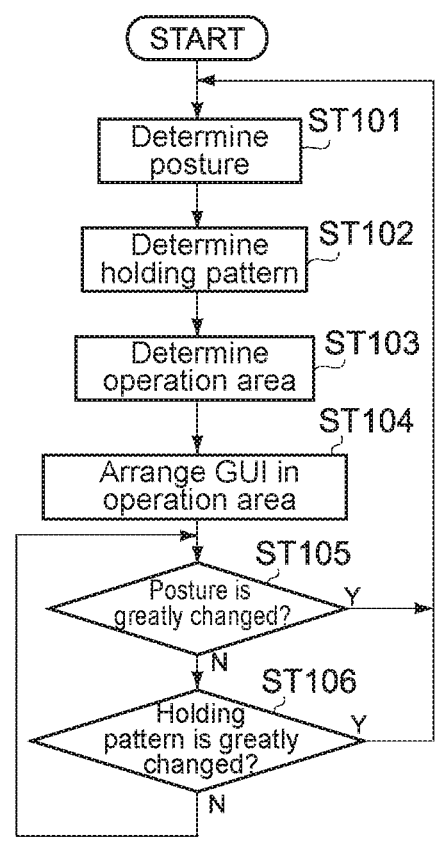
FIG. 4 is a flowchart showing setting processing of an operation area.

Next, processing of the control section 11 will be described. In the description about the processing of the control section 11, setting processing of the operation area 5 (see FIG. 8 to FIG. 12 described later) with respect to the side circumference surface 3 of the housing 10 will be first described. Note that the operation area 5 is an area in which an input by a user's operation becomes effective. FIG. 4 is a flowchart showing the setting processing of the operation area 5.

Figure 5:
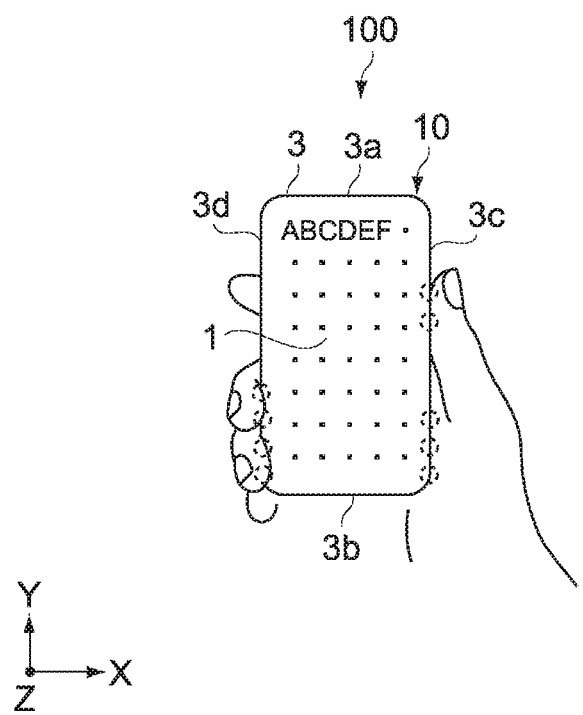
FIG. 5 is a view showing a state when a housing is held by a user.
Figure 6:
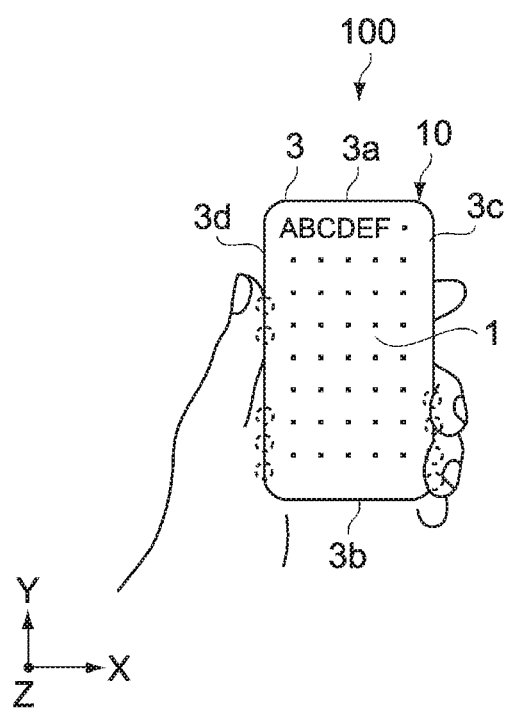
FIG. 6 is a view showing a state when a housing is held by a user.
Figure 7:
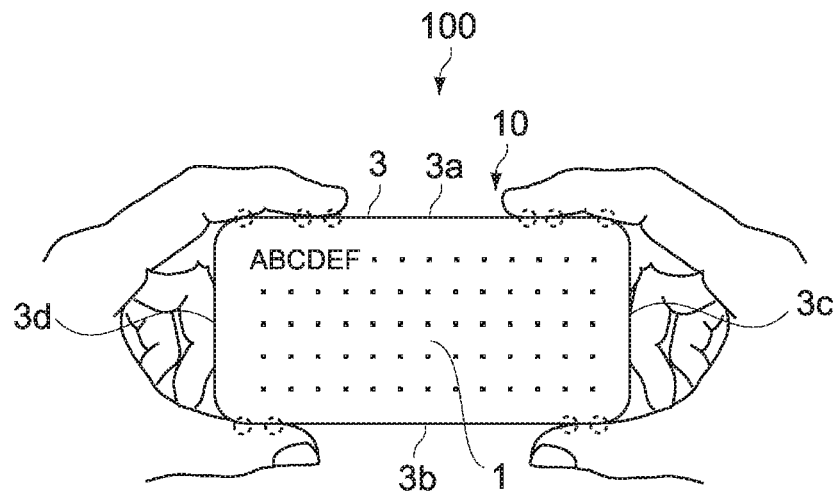
FIG. 7 is a view showing a state when a housing is held by a user.

FIG. 5 to FIG. 7 show states when the housing 10 is held by the user. FIG. 5 is a view showing a state when the housing 10 in a vertical posture (posture in which longer direction (Y axis direction) is closer to the gravity direction than shorter direction (X axis)) is held by a user's right hand. FIG. 6 is a view showing a state when the housing 10 in a vertical posture is held by a user's left hand. FIG. 7 is a view showing a state when the housing 10 in a horizontal posture (posture in which shorter direction (X axis) is closer to the gravity direction than longer direction (Y axis direction)) is held by user's both hands.

Note that, in this description, a variety of application programs such as a browser, a mail, music, and a map are executed, a variety of types of images are displayed on the display section 13 on the front surface 1 of the housing 10.

First, the control section 11 determines the gravity direction on the basis of a detection value detected by the motion sensor 19 and determines the posture of the housing 10 at present from the determined gravity direction (Step 101). For example, in Step 101, the control section 11 determines that the housing 10 is in the vertical posture as shown in FIG. 5 and FIG. 6 or the housing 10 is in the horizontal posture as shown in FIG. 7.

Next, the control section 11 determines a holding pattern of the housing 10 at present (pattern showing that how housing 10 is held by user) on the basis of the pressure value detected by each pressure-sensitive sensor 21 (Step 102).

In Step 102, the control section 11 first determines whether or not the pressure value detected by each pressure-sensitive sensor 21 exceeds a predetermined threshold. An appropriate value is set to the threshold used at this time for determining whether or not the user holds the housing 10. This value is set to, for example, 100 gf to 200 gf.

In a case where the pressure value exceeds the predetermined threshold, the control section 11 determines points in which the pressure-sensitive sensors 21 that detect the pressure value are arranged and determines that the points are held by the user. Then, the control section 11 determines the holding pattern of the housing 10 at present from the positions of the respective points determined as the user holds.

In FIG. 5 to FIG. 7, examples of the points in which it is determined that the user holds are shown by circles surrounded by dashed lines.

In an example shown in FIG. 5, it is determined that two points at an upper side under pressure of the thumb of the user's right hand and three points at a lower side under pressure of a palm of the user's right hand are held by the user in the right side surface 3c of the housing 10. In addition, in the left side surface 3d of the housing 10, it is determined that four points at a lower side under pressure of the second finger and the third finger of the user's right hand are held by the user.

In an example shown in FIG. 6, it is determined that two points at an upper side under pressure of the thumb of the user's left hand and three points at a lower side under pressure of the palm of the user's left hand are held by the user in the left side surface 3d of the housing 10. In addition, in the right side surface 3c of the housing 10, it is determined that four points at a lower side under pressure of the second finger and the third finger of the user's left hand are held by the user.

In an example shown in FIG. 7, it is determined that three points at a right side under pressure of the first finger of the user's right hand and three points at the right side under pressure of the first finger of the user's left hand are held by the user in the upper surface 3a of the housing 10. In addition, in the lower surface 3b of the housing 10, it is determined that two points at the right side under pressure of the thumb of the user's right hand and two points at the left side under pressure of the thumb of the user's left hand are held by the user.

After the respective points held by the user as shown in FIG. 5 to FIG. 7 are determined, the holding pattern is determined on the basis of the points of the respective points.

For example, the example shown in FIG. 5 is determined as one of the holding patterns of which the housing 10 is held by the right hand (one hand) from a total of nine points determined as the user holds. In addition, the example shown in FIG. 6 is determined as one of the holding patterns of which the housing 10 is held by the left hand (one hand) from a total of nine points determined as the user holds. In addition, the example shown in FIG. 7 is determined as one of the holding patterns of which the housing 10 is held by the both hands from a total of ten points determined as the user holds.

After the holding pattern is determined, the control section 11 next determines the position in which the operation area 5 is set in the side circumference surface 3 of the housing 10 on the basis of the posture and the holding pattern of the housing 10 and sets the operation area 5 at that position (Step 103). After the control section 11 sets the operation area 5, the GUI 6 is arranged at the position corresponding to the operation area 5 (Step 104).

FIG. 8 to FIG. 12 show states when the operation area 5 and the GUI 6 are arranged on the side circumference surface 3 of the housing 10.

Figure 8:
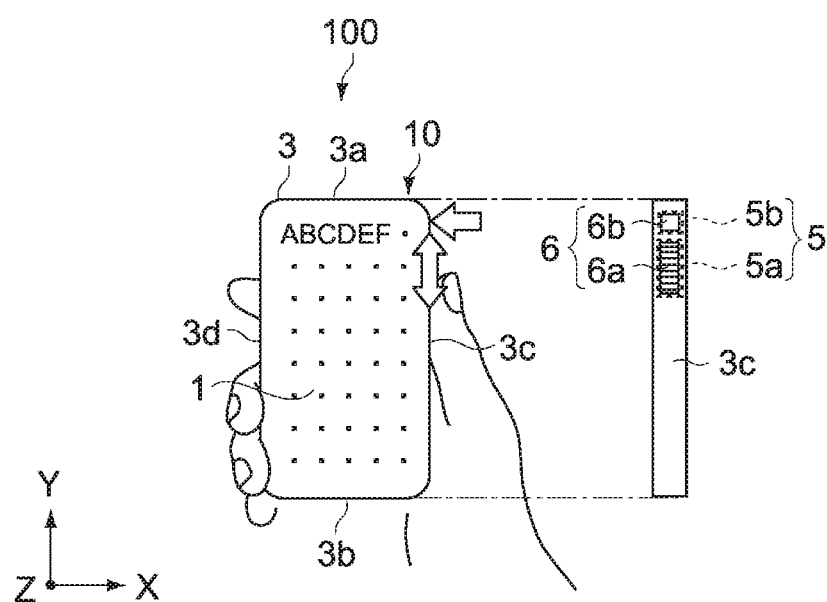
FIG. 8 is a view showing a state when the operation area and a GUI are arranged on a side circumference surface of the housing.

With reference to FIG. 8, in a case where the housing 10 has the vertical posture and the holding pattern held by the right hand, for example, the operation area 5 is set at an upper side position of the right side surface 3c of the housing 10. Then, the GUI 6 is arranged at the position corresponding to the operation area 5.

Here, in this embodiment, as the operation area 5, there are prepared two operation areas 5: a slide operation type operation area 5a, and a press operation type operation area 5b.

FIG. 8 shows an example case that the slide operation type operation area 5a is set at the upper side position of the right side surface 3c of the housing 10 and a GUI 6a for scrolling is arranged with respect to the slide operation type operation area 5a.

In addition, FIG. 8 shows an example case that the press operation type operation area 5b is set at the upper side position of the right side surface 3c of the housing 10 and a GUI 6b for switching images (switch button) is arranged with respect to the press operation type operation area 5b. In the example shown in FIG. 8, it is assumed that the operation area 5 is operated by the thumb of the right hand.

Incidentally, functions allocated to operation area 5 (functions allocated to GUI 6) are not limited to scrolling and image switching, and are changeable as appropriate. For example, any and all functions including playback, pause, fast-forward, rewind, determination, volume up/down, zoom in/out, power source ON/OFF, and the like may be allocated to the operation area 5.

In addition, the position in which the operation area is set (position in which GUI 6 is arranged) is also changeable as appropriate. Typically, the position in which the operation area 5 is set (position in which GUI 6 is arranged) may be any position as long as the user operates by finger(s) considering the posture and the holding pattern of the housing 10.

Figure 9:
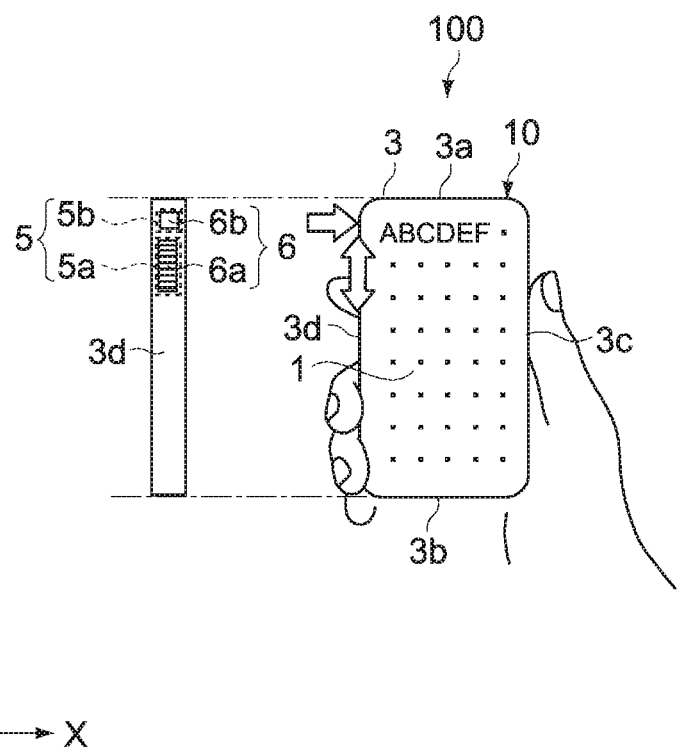
FIG. 9 is a view showing a state when the operation area and a GUI are arranged on a side circumference surface of the housing.

For example, as shown in FIG. 9, the operation area 5 may be set at the upper side position of the left side surface 3d of the housing 10 and the GUI 6 may be arranged at the position corresponding to the operation area 5. Incidentally, in this example, it is assumed that the operation area 5 is operated by the first finger of the right hand or the finger of the left hand (hand not holding housing).

Figure 10:
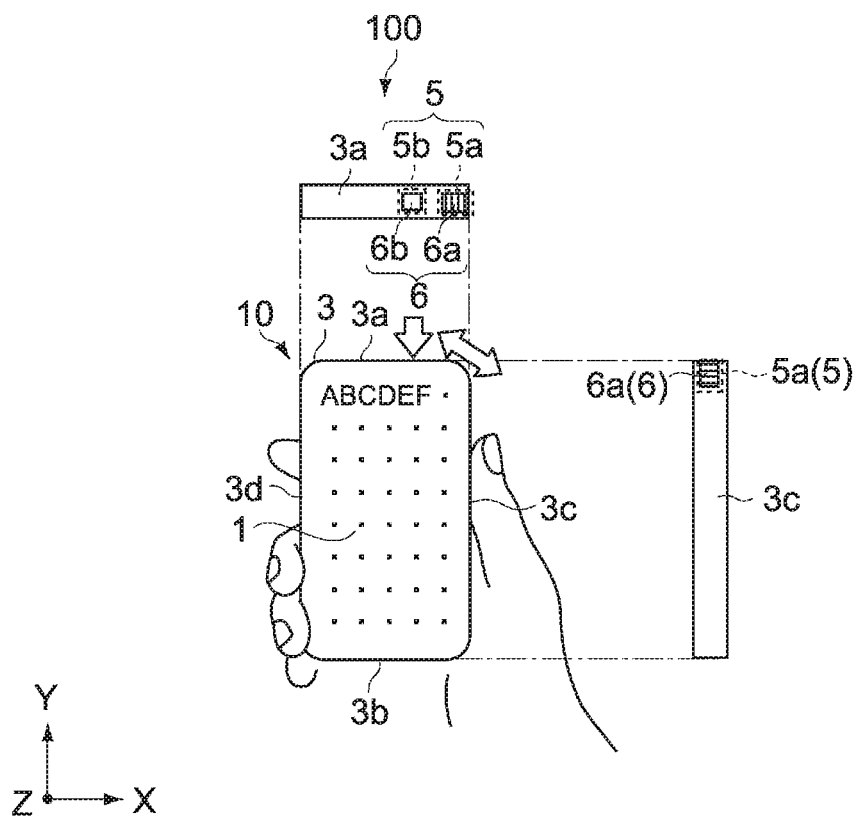
FIG. 10 is a view showing a state when the operation area and a GUI are arranged on a side circumference surface of the housing.

Alternatively, as shown in FIG. 10, the operation area 5 may be set at an upper right corner section (section in which upper surface 3a and right side surface 3c are connected) of the housing 10 and the GUI 6 may be arranged at the position corresponding to the operation area 5. Incidentally, in this example, it is assumed that the operation area 5 is operated by the thumb of the right hand.

Figure 11:
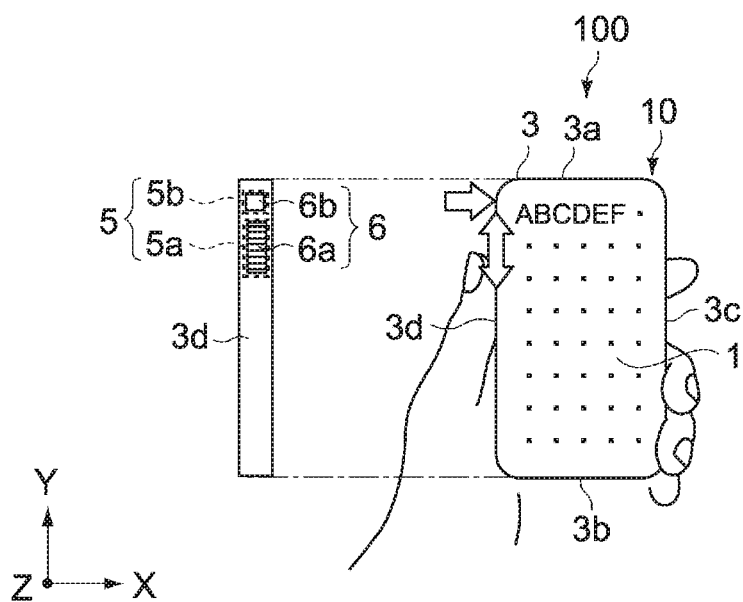
FIG. 11 is a view showing a state when the operation area and a GUI are arranged on a side circumference surface of the housing.

With reference to FIG. 11, in a case where the housing 10 has the vertical posture and the holding pattern held by the left hand, for example, the operation area 5 is set at an upper side position of the left side surface 3d of the housing 10. Then, the GUI 6 is arranged at the position corresponding to the operation area 5.

FIG. 11 shows an example case that the slide operation type operation area 5a is set at the upper side position of the left side surface 3d of the housing 10 and the GUI 6a for scrolling is arranged with respect to the slide operation type operation area 5a. In addition, FIG. 11 shows an example case that the press operation type operation area 5b is set at the upper side position of the left side surface 3d of the housing 10 and the GUI 6b for switching images (switch button) is arranged with respect to the press operation type operation area 5b. In the example shown in FIG. 11, it is assumed that the operation area 5 is operated by the thumb of the left hand.

Figure 12:
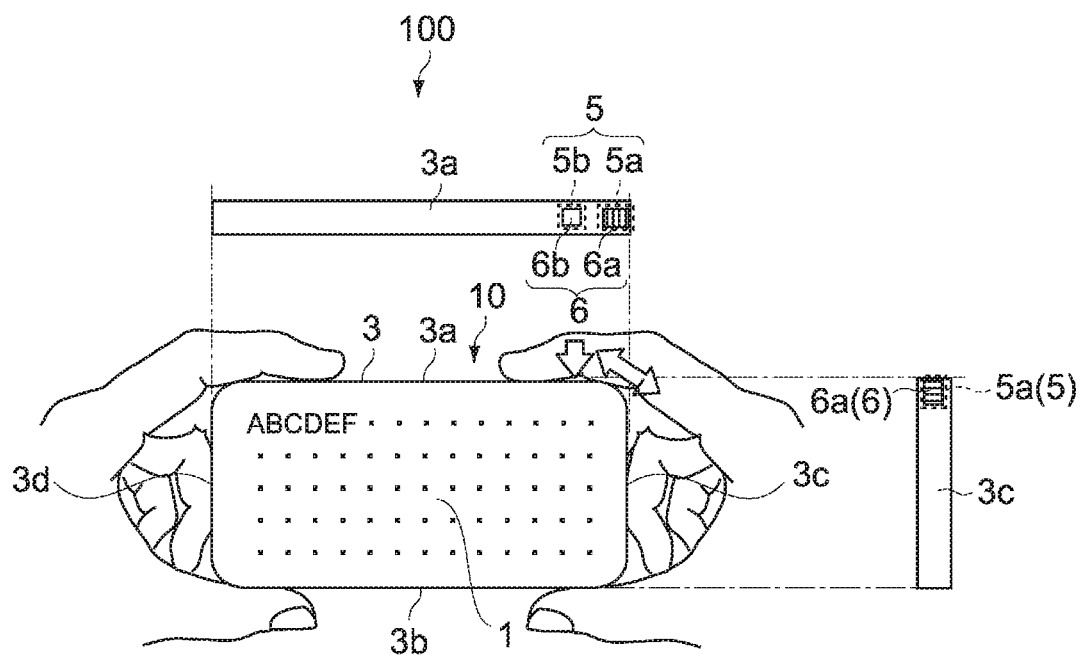
FIG. 12 is a view showing a state when the operation area and a GUI are arranged on a side circumference surface of the housing.

With reference to FIG. 12, in a case where the posture of the housing 10 is the horizontal posture and the holding pattern of the housing 10 is the holding pattern held by the both hands, the operation area 5 is set at the upper right corner section of the housing 10, for example. Then, the GUI 6 is arranged at the position corresponding to the operation area 5.

FIG. 12 shows an example case that the slide operation type operation area 5a is set at the upper right corner of the housing 10 and the GUI 6a for scrolling is arranged with respect to the slide operation type operation area 5a. In addition, FIG. 12 shows an example case that the press operation type operation area 5b is set at a right side position of the upper surface 3a of the housing 10 and the GUI 6b for switching images (switch button) is arranged with respect to the press operation type operation area 5b.

When the operation area 5 is set at the side circumference surface 3 of the housing 10, the control section 11 may cause a guide 8 showing the position in which the operation area 5 is set to be displayed on the display section 13 at the front surface 1 of the housing 10.

Figure 13:
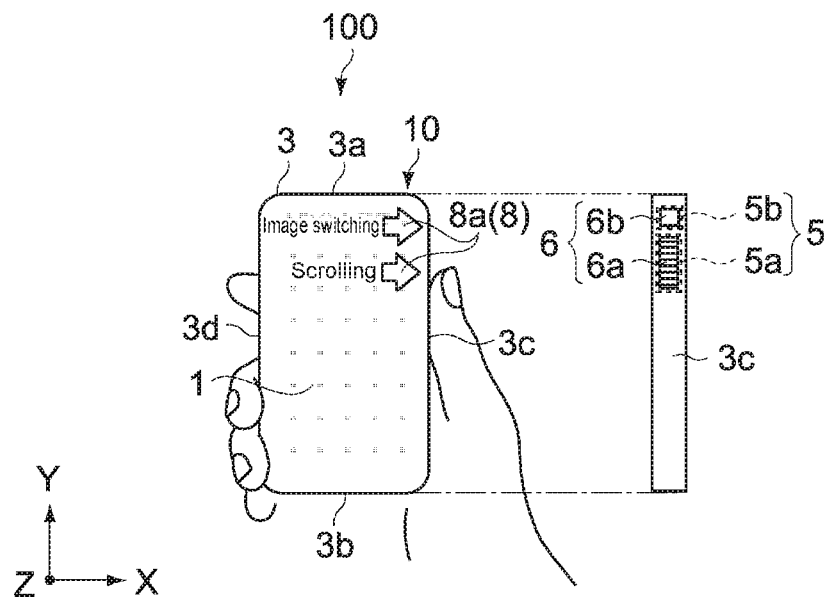
FIG. 13 is a view showing an example of a guide.
Figure 14:
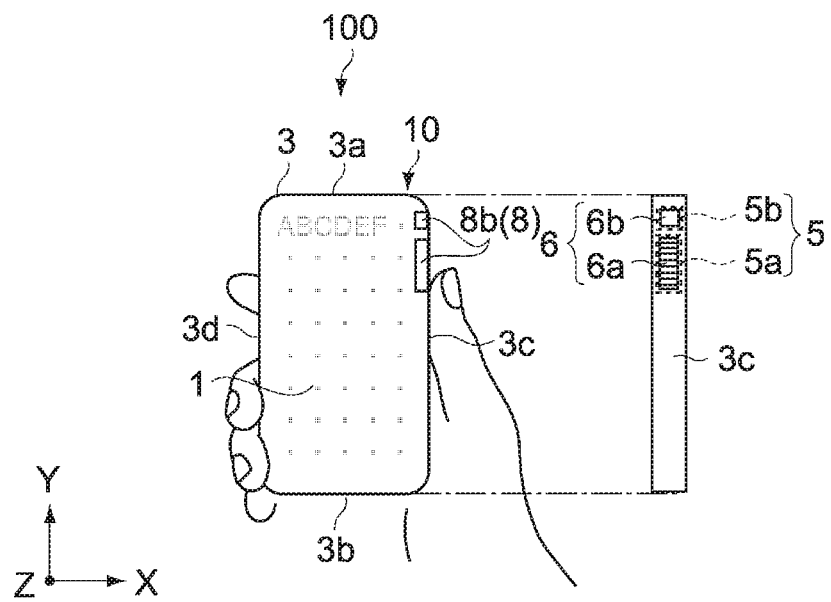
FIG. 14 is a view showing an example of a guide.

FIG. 13 and FIG. 14 are views showing examples of the guide 8. FIG. 13 shows a state when an arrow showing the position in which the operation area 5 is set (position in which GUI 6 is arranged) and a character showing the function allocated to the operation area 5 (function allocated to GUI 6) are displayed on the front surface 1 of the housing 10 as a guide 8a. Incidentally, the guide 8a is deleted from the display section 13 after a predetermined time (for example, several seconds) elapses after displaying.

FIG. 14 shows an example state when a figure that evokes the operation area 5 (GUI 6) is arranged as a guide 8b at the position of the front surface 1 of the housing 10 corresponding to the position in which the operation area 5 is set (position in which GUI 6 is arranged). Incidentally, the guide 8b is not deleted from the display section 13 even after a predetermined time (for example, several seconds) elapses after displaying but is not responded even if the user operates the guide 8b.

Note that the guide 8a shown in FIG. 13 and the guide 8b shown in FIG. 14 may be combined.

Referring back to FIG. 4, after the GUI 6 is arranged on the operation area 5, the control section 11 next determines whether or not the posture of the housing 10 is greatly changed on the basis of the detection value detected by the motion sensor 19 (Step 105). In a case where the posture of the housing 10 is greatly changed (YES in Step 105), the control section 11 returns to Step 101 and executes again the processing in Steps 101 to 104.

For example, in a case where the posture of the housing 10 is changed from the vertical posture (see FIG. 5 and FIG. 6) to the horizontal posture (see FIG. 7) or the posture of the housing 10 is changed from the horizontal posture to the vertical posture, the control section 11 determines that the posture of the housing 10 is greatly changed. Then, in this case, the control section 11 newly determines the posture and the holding pattern of the housing 10, newly sets the operation area 5 in accordance with the housing 10 and the holding pattern, and executes the processing of arranging the GUI 6 on the operation area 5.

In a case where the posture of the housing 10 is not greatly changed (NO in Step 105), the control section 11 next determines whether or not the holding pattern is greatly changed (Step 106). It is determined whether or not the holding pattern is greatly changed on the basis of the position of the pressure-sensitive sensor 21 that detects the pressure value of the predetermined threshold or more (points in which it is determined that user holds).

In a case where the holding pattern is not greatly changed (NO in Step 106), the control section 11 returns to Step 105 and determines again whether or not the posture of the housing 10 is greatly changed.

On the other hand, in a case where the holding pattern is greatly changed (YES in Step 105), the control section 11 returns to Step 101 and executes again the processing in Steps 101 to 104.

For example, the control section 11 determines that the holding pattern is greatly changed in a case where the holding pattern held by the right hand (one hand) (FIG. 5) is changed to the holding pattern held by the left hand (one hand) (FIG. 6) (or vice versa) and in a case where the holding pattern held by one hand (FIG. 5, FIG. 6) is changed to the holding pattern held by the both hands (FIG. 7) (or vice versa).

Then, in this case, the control section 11 newly determines the posture and the holding pattern of the housing 10, newly sets the operation area 5 in accordance with the housing 10 and the holding pattern, and executes the processing of arranging the GUI 6 with respect to the operation area 5.

[Identification Processing of Holding Status or Operation Status]

Figure 15:
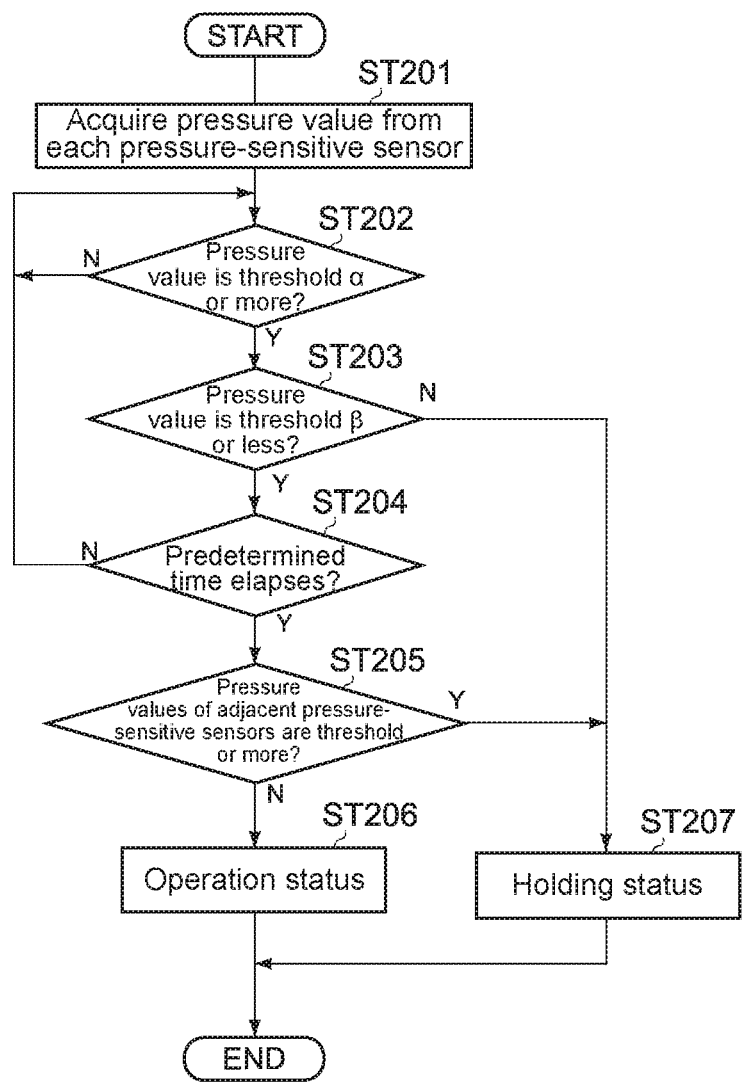
FIG. 15 is a flowchart showing processing of identifying a holding status and an operation status.

Next, identification processing will be described. The control section 11 identifies a status that the operation area 5 is held (holding status) or is operated (operation status). FIG. 15 is a flowchart showing the processing of identifying the holding status and the operation status.

First, the control section 11 acquires each pressure value from each pressure-sensitive sensor 21 arranged at the position corresponding to the operation area 5 (Step 201). Next, the control section 11 executes the processing in Step 202 to Step 207 in parallel on each pressure value from each pressure-sensitive sensor 21 arranged at the position corresponding to the operation area 5.

In Step 202, the control section 11 determines whether or not the pressure value is the threshold α or more. The value of the threshold α is set to the value smaller than the pressure value when the user lightly touches (or lightly presses in) the operation area 5 on the side circumference surface 3 of the housing 10 and the value of the threshold α is set to about 10 gf to 20 gf.

In a case where the pressure value is less than the threshold α (NO in Step 202), the control section 11 returns to Step 202 and determines again whether or not the pressure value is the threshold α or more. On the other hand, in a case where the pressure value is the threshold α or more (YES in Step 202), the control section 11 determines whether or not the pressure value is the threshold β or less (Step 203). The value of the threshold β is set to the value greater than the pressure value when the user lightly touches (or lightly presses in) the operation area 5 on the side circumference surface 3 of the housing 10 and the value of the threshold α is set to about 100 gf to 200 gf.

In a case where the pressure value is the threshold β or less (YES in Step 203), the control section 11 determines whether or not a predetermined time t (for example, about 0.3 to 0.8 seconds) elapses from a time T1 when the pressure value exceeds α (Step 204).

In a case where the predetermined time t does not elapse (NO in Step 204), the control section 11 returns to Step 202 and determines again whether or not the pressure value is the threshold α or more.

In a case where the pressure value exceeds β (NO in Step 203) before the predetermined time t (for example, about 0.3 to 0.8 seconds) elapses from the time T1 when the pressure value exceeds the threshold α (see Step 204), the control section 11 proceeds to Step 207. In Step 207, the control section 11 determines that the points (hereinafter referred to as corresponding points) in which the pressure-sensitive sensors 21 that detect the pressure value to be determined are arranged is in the holding status (Step 207).

In a case where the predetermined time t elapses (YES in Step 204) while the pressure value remains within the range within the threshold α or more and the threshold β or less (see Steps 202, 203), the control section 11 proceeds to next Step 205.

In Step 205, the control section 11 determines whether or not each pressure value (second pressure value) of the two pressure-sensitive sensors 21 (second pressure-sensitive sensors) adjacent to the pressure-sensitive sensor 21 (first pressure-sensitive sensor) that detects the pressure value (first pressure value) to be determined is the predetermined threshold or more. The value of the threshold is set to, for example, about 10 gf to 20 gf.

In a case where at least one of the pressure value of the adjacent two pressure-sensitive sensors 21 is the predetermined threshold or more (YES in Step 205), the control section 11 determines that the corresponding points are in the holding status (Step 207).

On the other hand, in a case where both pressure values of the adjacent two pressure-sensitive sensors 21 are less than the predetermined threshold (NO in Step 205), the control section 11 determines that the corresponding points are in the operation status (Step 206).

Figure 16:
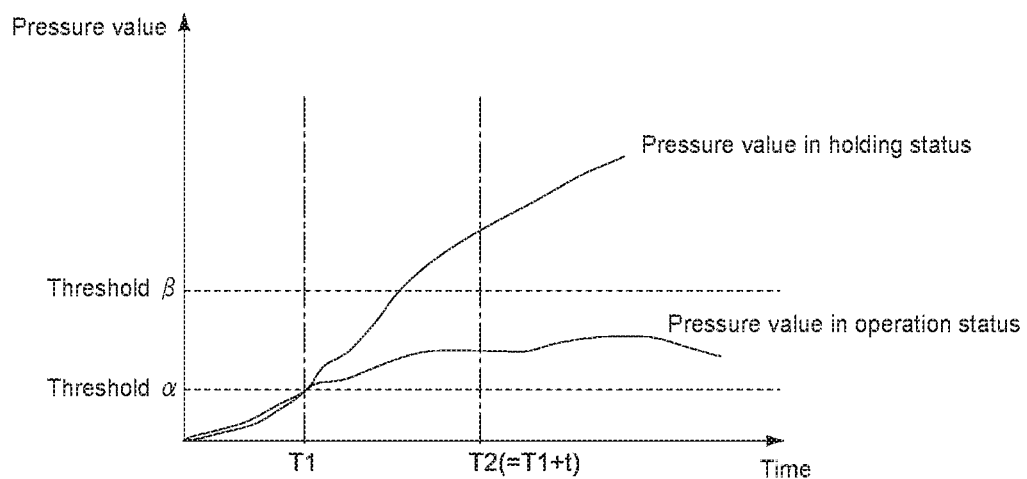
FIG. 16 is a comparison diagram between a pressure value in the operation status and a pressure value in the holding status.

FIG. 16 is a comparison diagram between the pressure value in the operation status and the pressure value in the holding status.

As shown in FIG. 16, the pressure value in the operation status takes the threshold α (about 10 gf to 20 gf) or more at the time T1 and then often continues to take the value within the range of the threshold α or more and the threshold β or less during a period from the predetermined time t (about 0.3 to 0.8 seconds) elapsed to a time T2. On the other hand, the pressure value in the holding status takes the threshold α (about 10 gf to 20 gf) or more at the time T1 and then often exceeds the threshold β after the predetermined time t (about 0.3 to 0.8 seconds) elapses and before it reaches the time T2.

In this embodiment, by utilizing this relationship, the control section 11 identifies the holding status from the operation status. Typically, in Steps 202 to 204, the control section 11 determines whether or not it satisfies the condition that the pressure value continues to take the value within the predetermined range (range of threshold α or more and threshold β or less) within the predetermined time (time from time T1 when pressure value exceeds α to predetermined time t elapsed). Then, if the above-described condition is satisfied, the control section 11 determines that the corresponding points are in the operation status under the predetermined condition. On the other hand, if the above-described condition is not satisfied, the control section 11 determines that the corresponding points are in the holding status.

Here, it is also assumed that the pressure value in the holding status may take a value similar to the pressure value in the operation status as shown in FIG. 16. In this case, regardless of the holding status, the control section 11 may erroneously decide it is in the operation status. In order to prevent the erroneous decision, the control section 11 determines whether or not the pressure values of the adjacent pressure-sensitive sensors 21 are the predetermined threshold or more in Step 205.

In other words, as shown in FIG. 5 to FIG. 7, when the housing 10 is held by the user, there are characteristics that the positions of the pressure-sensitive sensors 21 that detect the pressure values having the predetermined thresholds or more are easily adjacent. In this embodiment, the control section 11 utilizes the characteristics to improve identification accuracy of the holding status and the operation status. Specifically, the control section 11 determines not as the operation status but as the holding status in a case where at least one of the pressure values of the two adjacent pressure-sensitive sensors 21 exceeds the predetermined thresholds even if the above-described conditions are satisfied. Then, only in a case where the above-described conditions are satisfied and the both pressure values of the adjacent two pressure-sensitive sensors 21 are less than the predetermined threshold, it is determined as the operation status.

[Processing in Operation Status]

Figure 17:
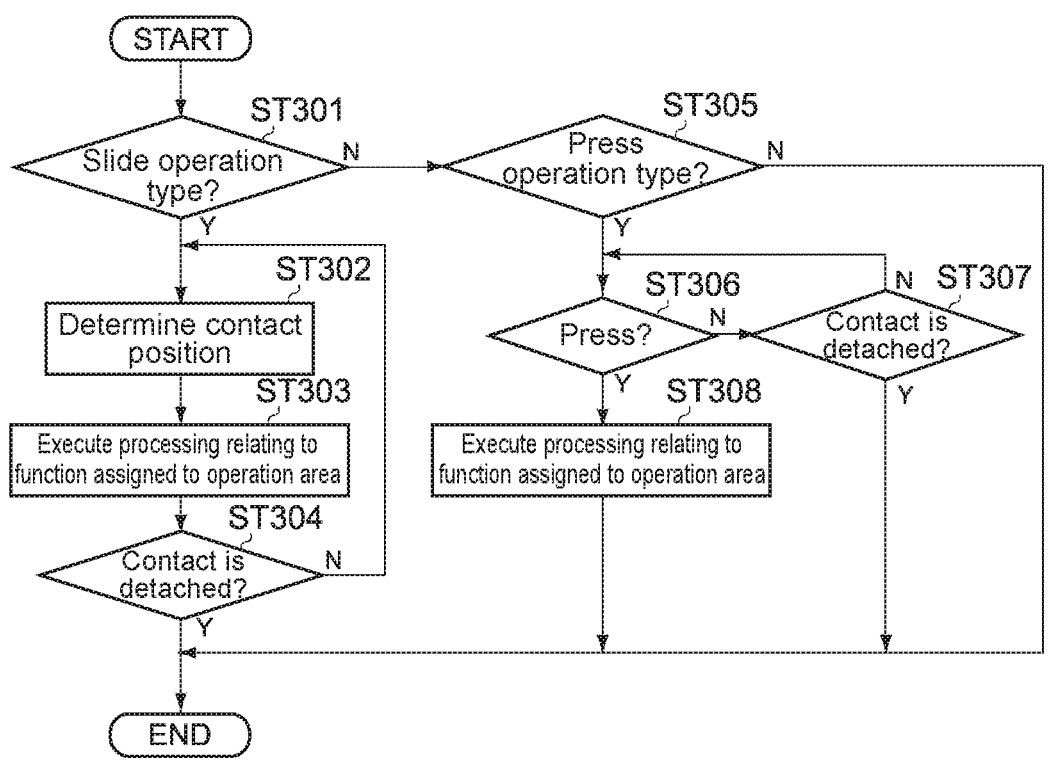
FIG. 17 is a flowchart showing processing when a status is determined that an operation area 5 is operated.

Next, when the status is determined that the operation area 5 is operated by the user, processing will be described. FIG. 17 is a flowchart showing processing when the status is determined that the operation area 5 is operated.

First, the control section 11 determines whether or not the operation area 5 including the points determined as in the operation status is the slide operation type operation area 5a (Step 301). In a case where the operation area 5 is the slide operation type operation area 5a (YES in Step 301), the control section 11 determines a contact position of the user's finger on the basis of the detection value detected by the proximity sensor 20 (Step 302).

Next, the control section 11 executes processing relating to a function assigned to the operation area 5 (function of GUI 6) in accordance with the contact position of the user's finger as long as the contact position of the user's finger is not outside of the operation area 5 (Step 303). Next, the control section 11 determines whether or not a contact of the user's finger is detached on the basis of the detection value detected by the proximity sensor 20 (Step 304).

In a case where the contact of the user's finger is not detached (NO in Step 304), the control section 11 returns to Step 302 and determines again the contact position of the user's finger. On the other hand, in a case where the contact of the user's finger is detached (YES in Step 304), the control section 11 ends the processing.

Note that, in this embodiment, once it is determined that the operation area 5 is in the operation status (see Step 206 of FIG. 16), the contact position of the user's finger is determined by the proximity sensor 20. Accordingly, even if the pressure value is less than the threshold α (for example, pressure value is 0 gf) or exceeds the threshold β when the user's finger is slid on the side circumference surface 3 and if the proximity sensor 20 can detect the finger, the processing relating to the function assigned to the operation area 5 (function of GUI 6) is executed.

In Step 301, in a case where the operation area 5 is not the slide operation type operation area 5a (NO in Step 301), the control section 11 determines whether or not the operation area 5 is the press operation type operation area 5b (Step 305).

In a case where the operation area 5 is the press operation type operation area 5b (YES in Step 305), the control section 11 determines whether or not the operation area 5 is pressed on the basis of the pressure value detected by the pressure-sensitive sensor 21 (Step 306). Here, for the threshold that becomes a determination criteria of pressing, a value greater than the threshold β is typically set.

In a case where the operation area 5 is pressed (YES in Step 306), the control section 11 executes the processing relating to the function assigned to the operation area 5 (function of GUI 6) (Step 308) and ends the processing.

In a case where the operation area 5 is not pressed (NO in Step 306), the control section 11 determines whether or not the contact of the user's finger is detached on the basis of the detection value detected by the proximity sensor 20 (Step 307).

In a case where the contact of the user's finger is not detached (NO in Step 307), the control section 11 returns to Step 306 and determines again whether or not the operation area 5 is pressed. On the other hand, in a case where the user's finger is detached (YES in Step 307), the control section 11 ends the processing.

[Operation of Operation Area 5 (GUI 6) by User]

Next, it specifically describes what kinds of processing is executed with reference to FIG. 8 to FIG. 12 when the user operates the operation area 5.

For example, when the predetermined time t (about 0.3 to 0.8 seconds) elapses after the user's finger lightly touches (or lightly presses in) the slide operation type operation area 5a (GUI 6a for scrolling), it is determined that the operation area 5 is in the operation status (see Steps 201 to 206). Thereafter, when the user's finger performs a slide operation (or flick operation), the contact position is detected and an image displayed on the display section 13 of the front surface 1 is scrolled in accordance with the contact position (Steps 301 to 304).

In addition, when the predetermined time t (about 0.3 to 0.8 seconds) elapses after the user's finger lightly touches (or lightly presses in) the press operation type operation area 5b (GUI 6b for switching images), it is determined that the operation area 5 is in the operation status (see Steps 201 to 206). Thereafter, when the user's finger further presses in, pressing is detected and the image displayed on the display section 13 of the front surface 1 is switched to other image (Steps 305 to 308).

[Camera Application]

Figure 18:
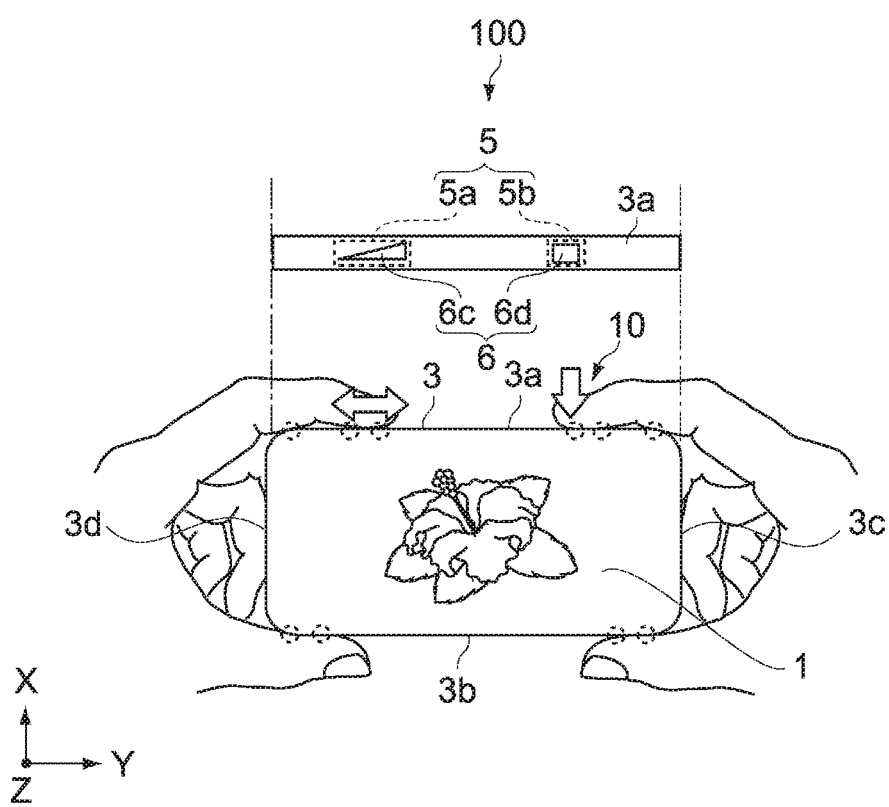
FIG. 18 is a view showing an example case to which the present technology is applied to a camera application.
Figure 19:
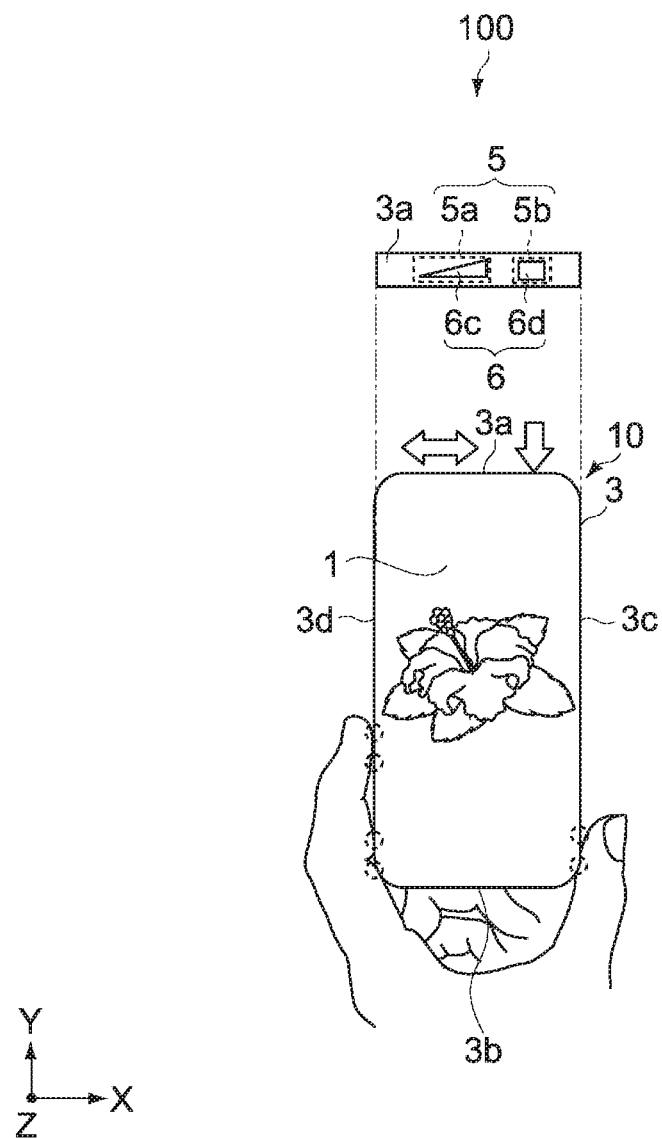
FIG. 19 is a view showing an example case to which the present technology is applied to a camera application.
Figure 20:
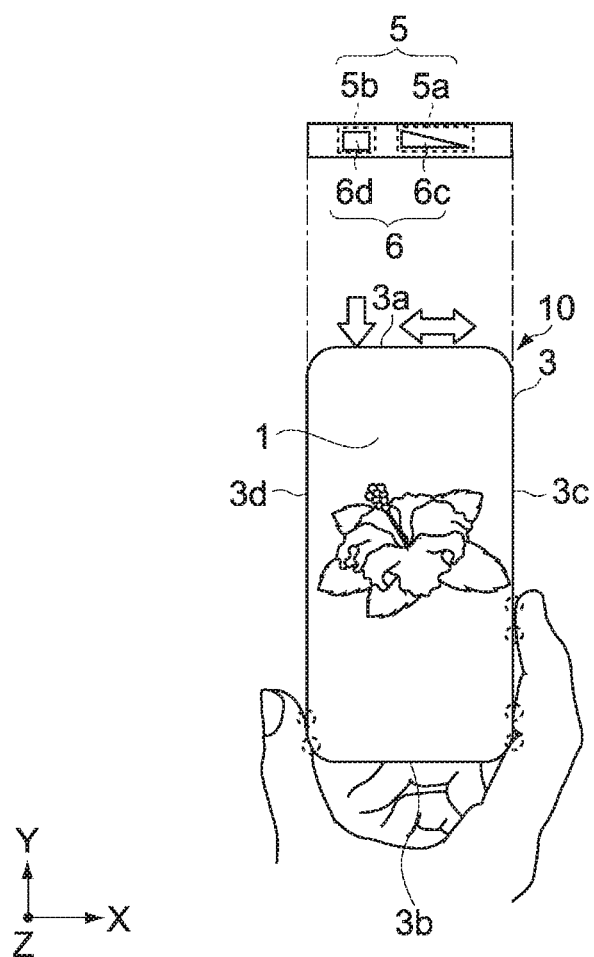
FIG. 20 is a view showing an example case to which the present technology is applied to a camera application.

Next, a case to which the present technology is applied to a camera application will be described. FIG. 18 to FIG. 20 are views showing an example case to which the present technology is applied to a camera application.

Incidentally, in FIG. 18 to FIG. 20, the user tries to image-capture a flower. FIG. 18 to FIG. 20 show an example case that the flower to be image-captured is displayed on the display section 13 of the front surface 1.

The control section 11 determines the posture of the housing 10 and then determines the holding pattern of the housing 10 (Steps 101 to 102). In FIG. 18 to FIG. 20, examples of the points in which it is determined that the user holds are shown by circles surrounded by dashed lines.

Next, the control section 11 sets the operation area 5 on the side circumference surface 3 of the housing 10 on the basis of the posture and the holding pattern of the housing 10 and arranges the GUI 6 at the position corresponding to the operation area 5 (Steps 103 to 104).

FIG. 18 to FIG. 20 show states that the operation area 5 and the GUI 6 are arranged with respect to the side circumference surface 3 of the housing 10.

With reference to FIG. 18, in a case where the posture of the housing 10 is the horizontal posture and the holding pattern of the housing 10 is the holding pattern held by the both hands, the operation area 5 is set at the upper surface 3a of the housing 10 and the GUI 6 is arranged within the operation area 5, for example.

FIG. 18 shows an example case that the slide operation type operation area 5a is set at a left side of the upper surface 3a of the housing 10 and a GUI 6c for zoom-in/out is arranged with respect to the slide operation type operation area 5a. In addition, FIG. 18 shows an example case that the press operation type operation area 5b is set at a right side of the upper surface 3a of the housing 10 and a GUI 6d for shutter (shutter button) is arranged with respect to the press operation type operation area 5b.

Incidentally, in the example shown in FIG. 18, it is assumed that the GUI 6c for zoom-in/out is operated by the first finger of the left hand and the GUI 6d for shutter (shutter button) is operated by the first finger of the right hand.

With reference to FIG. 19, in a case where the housing 10 is in the vertical posture and the holding pattern of the housing 10 is the holding pattern held by the left hand, for example, the operation area 5 is set at the upper surface 3a of the housing 10 and the GUI 6 is arranged within the operation area 5.

FIG. 19 shows an example case that the slide operation type operation area 5a is set at the left side of the upper surface 3a of the housing 10 and the GUI 6c for zoom-in/out is arranged with respect to the slide operation type operation area 5a. In addition, FIG. 19 shows an example case that the press operation type operation area 5b is set at the right side of the upper surface 3a of the housing 10 and the GUI 6d for shutter (shutter button) is arranged with respect to the press operation type operation area 5b.

Incidentally, in the example shown in FIG. 19, it is assumed that the GUI 6c for zoom-in/out and the GUI 6d for shutter (shutter button) is operated by the fingers of the right hand (hand not holding housing 10).

With reference to FIG. 20, in a case where the housing 10 is in the vertical posture and the holding pattern of the housing 10 is the holding pattern held by the right hand, for example, the operation area 5 is set at the upper surface 3a of the housing 10 and the GUI 6 is arranged within the operation area 5.

FIG. 20 shows an example case that the slide operation type operation area 5a is set at the right side of the upper surface 3a of the housing 10 and the GUI 6c for zoom-in/out is arranged with respect to the slide operation type operation area 5a. In addition, FIG. 20 shows an example case that the press operation type operation area 5b is set at the left side of the upper surface 3a of the housing 10 and the GUI 6d for shutter (shutter button) is arranged with respect to the press operation type operation area 5b.

Incidentally, in the example shown in FIG. 20, it is assumed that the GUI 6c for zoom-in/out and the GUI 6d for shutter (shutter button) are operated by the fingers of the left hand (hand not holding housing 10).

As understood from the comparisons between FIG. 8 to FIG. 12 and FIG. 18 to FIG. 20, the position in which the operation area 5 is set (position in which GUI 6 is arranged) may be different for each application to be executed. In addition, the function allocated to operation area 5 (function allocated to GUI 6) may be different for each application to be executed.

When the operation area 5 is set, the control section 11 may cause the guide 8 showing the position in which the operation area 5 is set to be displayed on the display section 13 at the front surface 1 of the housing 10.

Figure 21:
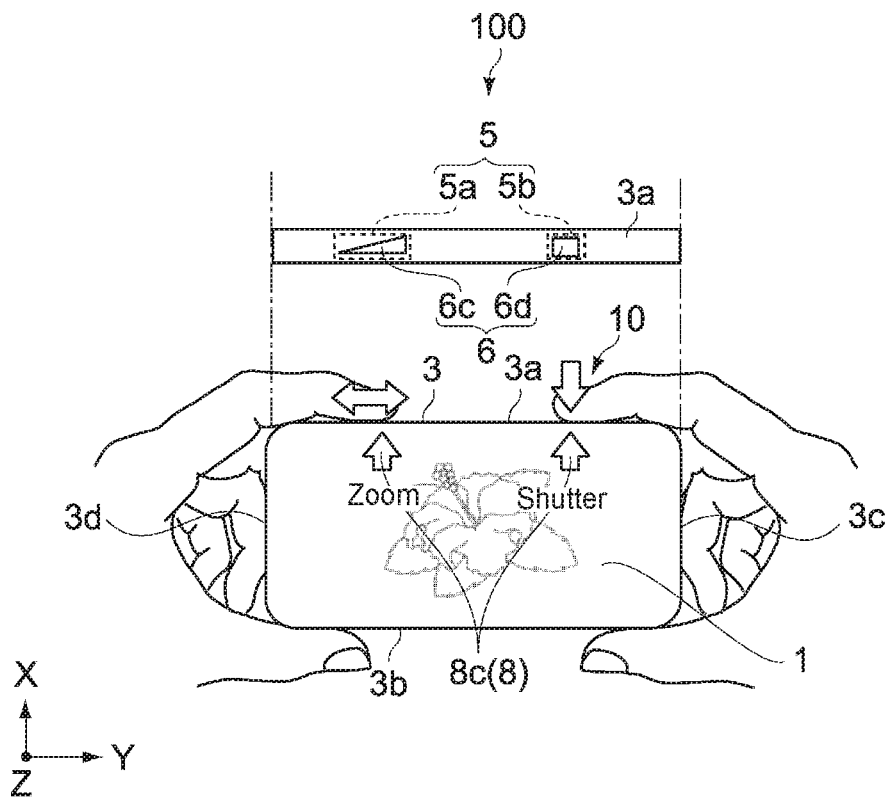
FIG. 21 is a view showing an example of a guide.
Figure 22:
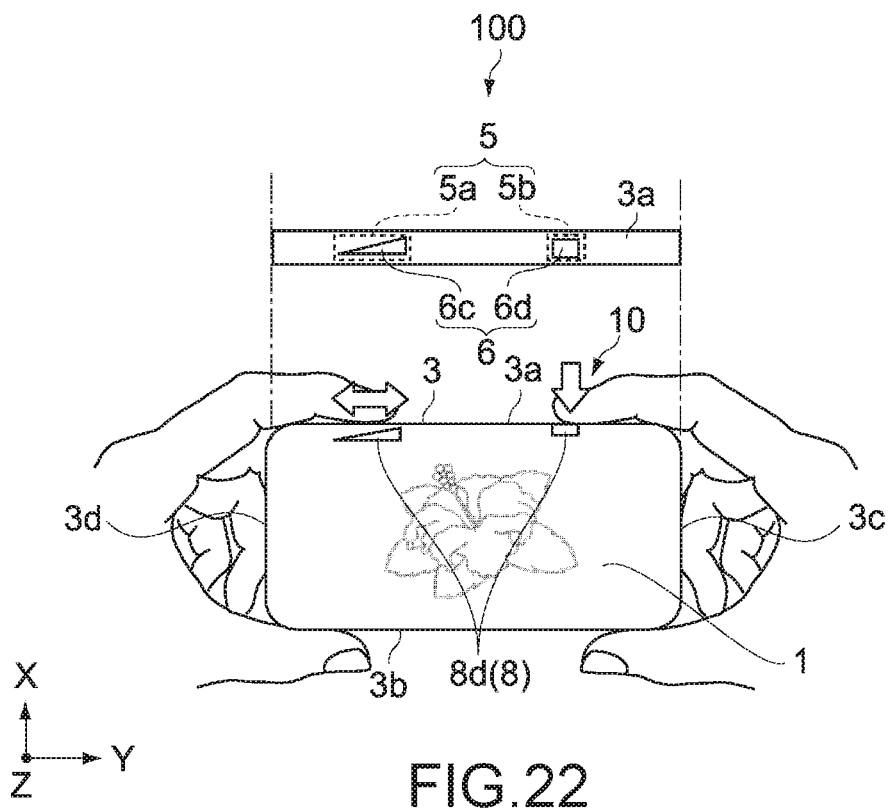
FIG. 22 is a view showing an example of a guide.

FIG. 21 and FIG. 22 are views, each of which shows an example of the guide 8. The example shown in FIG. 21 shows the state that when the arrow showing the position in which the operation area 5 is set (position in which GUI 6 is arranged) and the character showing the function allocated to the operation area 5 (function allocated to GUI 6) are displayed on the front surface 1 of the housing 10 as a guide 8c. Incidentally, the guide 8c is deleted from the display section 13 after a predetermined time (for example, several seconds) elapses after displaying.

FIG. 21 shows an example state when a figure that evokes the operation area 5 (GUI 6) is arranged as a guide 8d at the position of the front surface 1 of the housing 10 corresponding to the position in which the operation area 5 is set (position in which GUI 6 is arranged). Incidentally, the guide 8d is not deleted from the display section 13 even after a predetermined time (for example, several seconds) elapses after displaying but is not responded even if the user operates the guide 8d.

Note that the guide 8c shown in FIG. 21 and the guide 8d shown in FIG. 22 may be combined.

For example, when the predetermined time t (about 0.3 to 0.8 seconds) elapses after the user's finger lightly touches (or lightly presses in) the slide operation type operation area 5a (GUI 6c for zoom-in/out), it is determined that the operation area 5 is in the operation status (see Steps 201 to 206). Thereafter, when the user's finger performs the slide operation (or flick operation), the contact position is detected and an image is zoomed in/out in accordance with the contact position (Steps 301 to 304).

In addition, when the predetermined time t (about 0.3 to 0.8 seconds) elapses after the user's finger lightly touches (or lightly presses in) the press operation type operation area 5b (GUI 6d for shutter), it is determined that the operation area 5 is in the operation status (see Steps 201 to 206). Thereafter, when the user's finger further presses in, pressing is detected and an image is captured (Steps 305 to 308).

<Actions, Etc.>

As described above, in this embodiment, it is identified that the operation area 5 is operated by the user and the operation area 5 is held by the user on the basis of the pressure value detected by the pressure-sensitive sensor 21. Thus, the operation status and the holding status can be accurately identified.

Accordingly, when the user holds the housing 10, it is possible to prevent the functions allocated to the operation area 5 (functions allocated to GUI 6) from being executed against the user's intention. In addition, from a standpoint of the user, it is possible to assuredly execute the functions allocated to the operation area 5 (functions allocated to GUI 6) on the side circumference surface while the side circumference surface in which the display section is arranged is held by the hands.

In addition, in this embodiment, the operation status and the holding status are identified on the basis whether or not it satisfies the condition that the pressure value continues to take the value within the predetermined range (range of threshold $\alpha$ or more and threshold $\beta$ or less) within the predetermined time (time from time T1 when pressure value exceeds $\alpha$ to predetermined time t elapsed). Thus, it is possible to improve identification accuracy of the operation status and the holding status.

In addition, in this embodiment, when the operation status and the holding status are identified, the pressure values of the two pressure-sensitive sensors 21 adjacent to the pressure-sensitive sensor 21 that detects the pressure value to be determined are referred. Thus, it is possible to further improve identification accuracy of the operation status and the holding status.

In addition, in this embodiment, the position in which the operation area 5 is set is determined on the basis of the posture of the housing 10. Thus, it is possible to set the operation area 5 at an appropriate position of the side circumference surface 3. In addition, in this embodiment, the position in which the operation area 5 is set is determined on the basis of the holding pattern of the housing 10 held by the user. Thus, it is possible to set the operation area 5 at a further appropriate position of the side circumference surface 3.

In addition, in this embodiment, when the posture of the housing 10 is changed, the position in which the operation area 5 is set at the side circumference surface 3 is newly determined on the basis of a change in the posture. Thus, it is possible to determine the position in which the operation area 5 is set appropriately following the change in the posture of the housing 10. In addition, in this embodiment, when the holding pattern is changed, the position in which the operation area 5 is set at the side circumference surface 3 is newly determined on the basis of a change in the holding pattern. Thus, it is possible to determine the position in which the operation area 5 is set appropriately following the change in the holding pattern.

In addition, in this embodiment, when the operation area 5 is set, the guide 8 showing the position in which the operation area 5 is set (and functions allocated to operation area 5) is displayed on the display section 13 at the front surface 1 of the housing 10. Thus, the user can easily recognize the position in which the operation area 5 is set (and functions allocated to operation area 5) from the front surface 1 of the housing 10.

In addition, in this embodiment, when the operation area 5 is set, the GUI 6 is displayed at the position corresponding to the operation area 5. Thus, by visually recognizing the GUI 6, the user can easily recognize the position in which the operation area 5 is set (and functions allocated to operation area 5) from the front surface 1 of the housing 10.

In addition, in this embodiment, in a case where the status is determined that the operation area 5 is operated by the user, predetermined processing is executed on the basis of the contact position detected by the proximity sensor 20. Thus, the user performs the slide operation (or flick operation) on the operation area 5 (after user lightly touches or lightly presses in operation area 5) and can then execute the functions allocated to the operation area 5 (for example, scrolling, zooming in/out).

Note that, in this embodiment, once it is determined that the operation area 5 is in the operation status, the contact position of the user's finger is determined by the proximity sensor 20. Thus, even if the pressure value is less than the threshold $\alpha$ (for example, pressure value is 0 gf) or exceeds the threshold $\beta$ when the user's finger performs the slide operation (or flick operation) on the side circumference surface 3, it is possible to appropriately execute the functions allocated to the operation area 5 according to the slide operation.

In addition, in this embodiment, in a case where the status is determined that the operation area 5 is operated by the user, predetermined processing is executed on the basis of the pressure value detected by each pressure-sensitive sensor 21. Thus, the user performs a press operation (or flick operation) on the operation area 5 (after user lightly touches or lightly presses in operation area 5) and can then execute the functions allocated to the operation area 5 (for example, image switching, shutter).

Here, for example, the GUI 6a for scrolling may be arranged on the front surface 1 of the housing 10 at a position closer to the side circumference surface 3. If the GUI 6a for scrolling is arranged at such a position and when the user's finger touches the side circumference surface 3, the user's finger is detected by the proximity sensor 20 at the front surface 1 of the housing 10 and scrolling may be executed against the user's intention. On the other hand, in this embodiment, the GUI 6a for scrolling (operation area 5) and the like are arranged on the side circumference surface 3 and it is possible to accurately identify the operation status and the holding status as described above. Therefore, it is possible to prevent failure.

Here, in a case of a typical smartphone, different from this embodiment, no pressure-sensitive sensor 21 is arranged on the side circumference surface 3 of the housing 10 and it is not possible to detect the pressure value with respect to the side circumference surface 3. In addition, in a case of a typical smartphone, scrolling is executed by operating the GUI for scrolling arranged on the front surface 1 of the housing 10 or flick-operating the front surface of the housing.

The control section 11 may identify whether or not the concerned smartphone is a smartphone incapable of detecting the pressure value with respect to the side circumference surface 3 as described above or a smartphone 100 (this embodiment) capable of detecting the pressure value with respect to the side circumference surface 3.

In a case where the smartphone is incapable of detecting the pressure value with respect to the side circumference surface 3, the control section 11 causes the GUI 6 for scrolling to be displayed on the front surface 1 of the housing 10 to execute scrolling on the basis of the operation of the GUI. Alternatively, the control section 11 detects a specific operation (for example, flick operation) with respect to the front surface 1 of the housing 10 and executes scrolling.

On the other hand, in a case where the smartphone (this embodiment) is capable of detecting the pressure value with respect to the side circumference surface, the control section 11 executes the setting processing of the operation area 5, the identification processing of the holding status or the operation status, and the processing in the operation status on the side circumference surface 3, as described above. At this time, the control section 11 may display the GUI 6 for scrolling on the front surface 1 of the housing 10 but the operation with respect to the GUI 6 for scrolling may be ineffective (inhibited) (in particular in a case where GUI 6 for scrolling is arranged at position closer to side circumference surface 3). In addition, at this time, the control section 11 may also detect the specific operation (for example, flick operation) with respect to the front surface 1 of the housing 10 but the specific operation (for example, flick operation) may be ineffective (inhibited). Here, scrolling is described as an example but the idea is applicable to other various processing such as zooming in/out.

<Various Modifications>
[Pressure-Sensitive Sensor]

Figure 23:
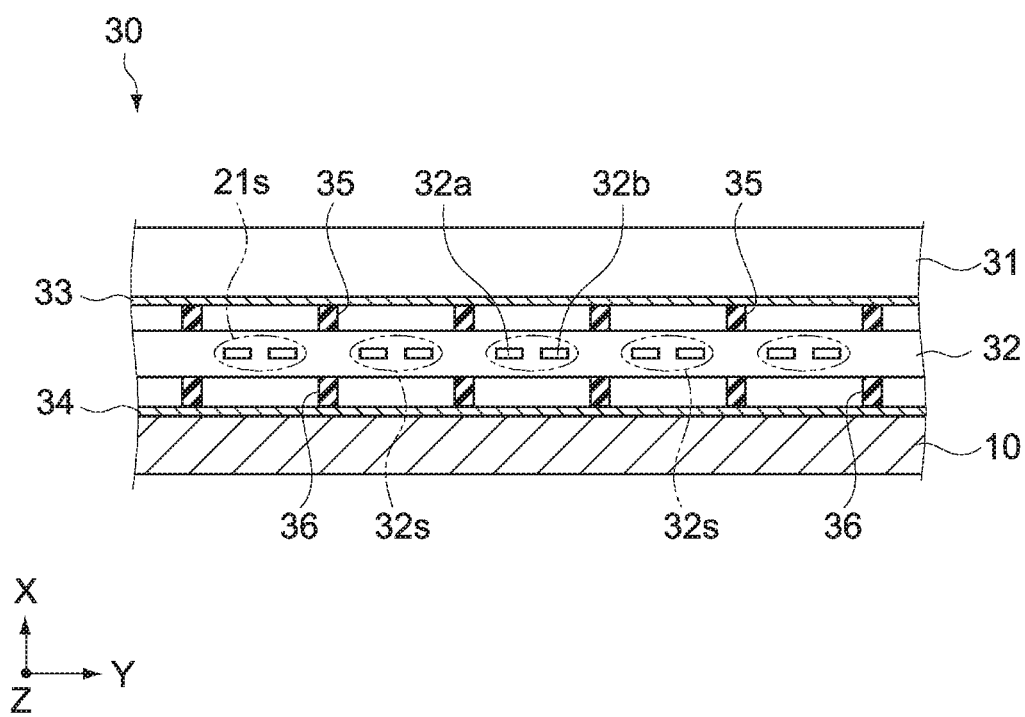
FIG. 23 is a cross-sectional view schematically showing a main part of a pressure-sensitive mechanism.

Next, an example of the pressure-sensitive sensor 21 specifically illustrates a pressure-sensitive mechanism 30 including the plurality of pressure-sensitive sensors 21. FIG. 23 is a cross-sectional view schematically showing a main part of the pressure-sensitive mechanism 30.

As shown in FIG. 23, the pressure-sensitive mechanism 30 is arranged between the housing 10 (side circumference surface 3) and a protection cover 31. The protection cover 31 is a member that coats the pressure-sensitive mechanism 30 and is typically formed of an elastic deformable material such as rubber and elastomer. The protection cover 31 protects the housing 10 from a drop impact and also transmits a force applied to the housing 10 by the user to the pressure-sensitive mechanism 30.

The pressure-sensitive mechanism 30 includes a circuit board 32, a first metal layer 33, a second metal layer 34, first supports 35, and second supports 36.

Figure 24:
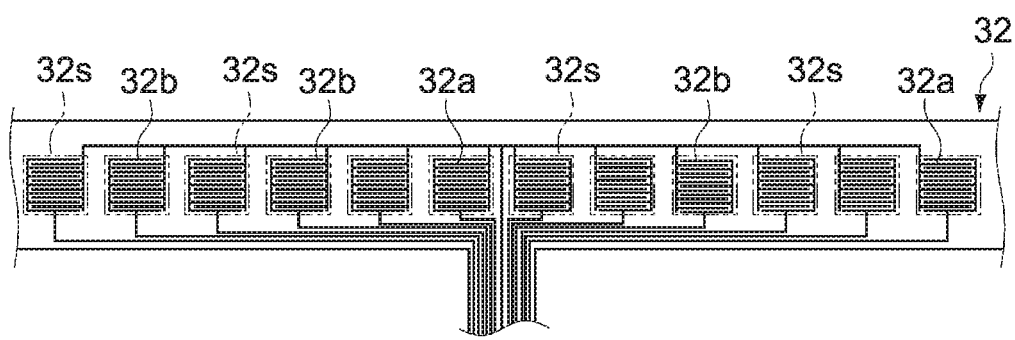
FIG. 24 is a view showing a circuit board.

FIG. 24 is a view showing the circuit board 32. The circuit board 32 includes a plurality of capacitive elements 32 arrayed at predetermined spaces in the Y axis direction (longitudinal direction). Each capacitive element 32s has a structure that each comb-like common electrode 32a and each individual electrode 32b are arranged by facing each other. Each capacitive element 32s is electrically connected to the control section 11 and is driven by receiving an input signal from the control section 11.

Incidentally, one capacitive element 32s, the first metal layer 33 arranged at the position with respect to the capacitive element 32s, the second metal layer 34, the first support 35, and the second support 35 form one pressure-sensitive sensor 21.

The first and second metal layers 33 and 34 are formed of metal foil such as copper foil fixed to outside of the housing 10 (side circumference surface 6) and inside of the protection cover 31 and is typically connected to the ground potential. The first and second supports 35, 36 are formed of a plurality of columnar materials elastically deformable in the X axis direction (shorter direction) and are arranged in line in the X axis direction across the circuit board 21. The first supports 35 are arranged between the first metal layer 33 and the circuit board 32, and the second supports 36 are arranged between the second metal layer 34 and the circuit board 32.

In the pressure-sensitive mechanism 30 (pressure-sensitive sensor 21) having the above-described structure, when a force is applied to a surface of the protection cover 31, relative distances between the circuit board 21 and the first and second metal layers 33 and 34 are locally changed. An amount of change is detected in each capacitive element 21s on the basis of a capacitance change between each common electrode 32a and each individual electrode 32b and the capacitance change is detected as the pressure value.

An electrostatic capacitance change of each capacitive element 21s is detected, for example, by using a mutual capacitance method. The mutual capacitance method is to measure proximity of a ground electrode such as a human and a metal plate by the electrostatic capacitance change between two sensing electrodes (common electrode 32a and individual electrode 32b). From the two sensing electrodes, it appears that the capacitance is decreased when a grounded human body, a metal plate, or the like comes closer.

A mutual capacitance type electrostatic capacitance sensor is generally used for a multi-touchable touch panel. In the multi-touchable touch panel, for example, 16 lines×10 lines wiring is formed in a matrix in the XY directions, 160 pairs of the sensing electrodes can be provided, each of which can individually detect finger proximity. If the pressure-sensitive sensor 21 is formed of a grounded conductive layer by covering a surface of the wiring in the matrix in the XY directions with a pressure-deformable metal plate, pressure on a metal surface can be detected in place of the finger proximity. For example, since deformation of the metal plate can be detected for 160 sensing electrode pairs, it is possible to estimate not only coordinates of plural pressure points in the XY directions but also pressure in the Z direction. At this time, as shown in FIG. 24, when two sensing electrodes are formed in comb shapes, the sensing electrodes are easily capacitively coupled to the metal plate, to thereby detect the capacitance change with high accuracy.

As described above, as the pressure-sensitive mechanism 30 (pressure-sensitive sensor 21), the structures shown in FIG. 23 and FIG. 24 are used but are not limited thereto. Typically, the metal layer having the ground potential may be one. As the minimum structure, a metal housing may be an alternative as one modification metal layer. Thus, the sensor itself even needs no metal layer.

Figure 25:
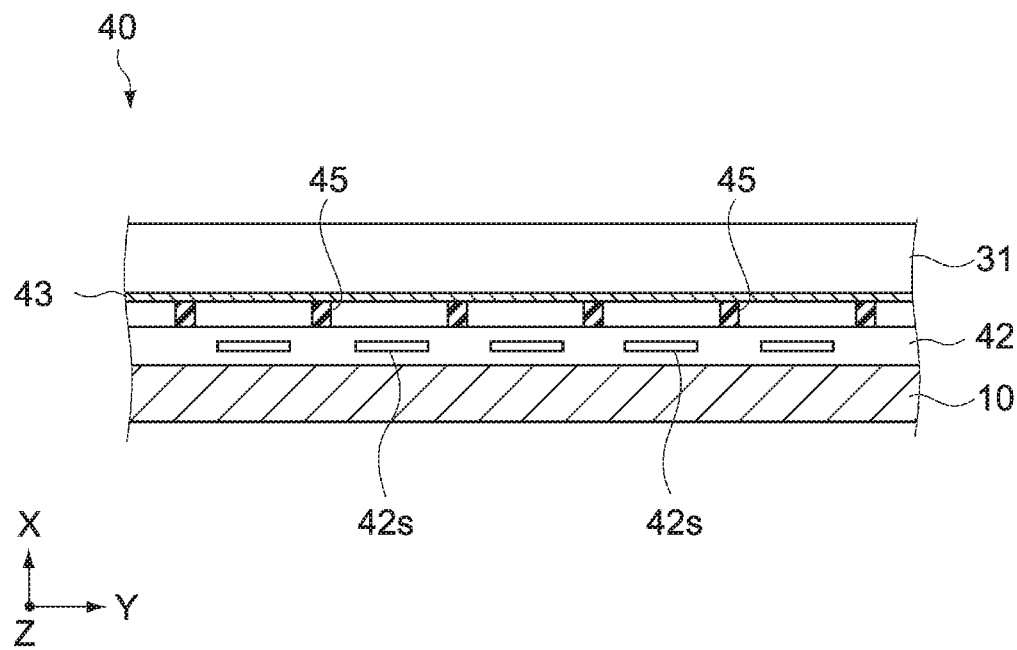
FIG. 25 is a cross-sectional view schematically showing a main part of a pressure-sensitive mechanism including a self capacitance type electrostatic capacitance sensor.
Figure 26:
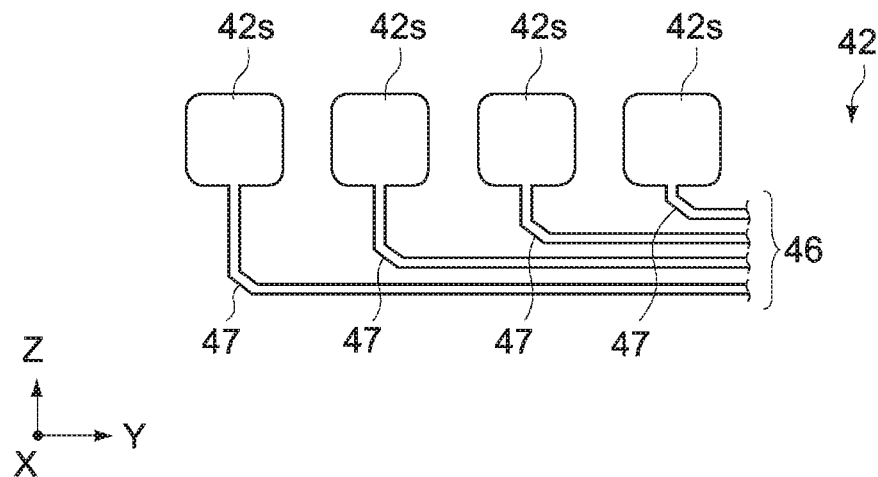
FIG. 26 is a view showing an electrode structure of the pressure-sensitive mechanism.

In place of the mutual capacitance type electrostatic capacitance sensor, a self capacitance type electrostatic capacitance sensor may be used. FIG. 25 is a cross-sectional view schematically showing a main part of a pressure-sensitive mechanism 40 including the self capacitance type electrostatic capacitance sensor and FIG. 26 is a schematic plan view showing an electrode structure of the pressure-sensitive mechanism 40.

As shown in FIG. 25, the pressure-sensitive mechanism 40 is arranged between the housing 10 and the protection cover 31. The pressure-sensitive mechanism 40 includes a circuit board 42, a metal layer 43, and supports 45. As shown in FIG. 26, the circuit board 40 includes a plurality of sensing electrodes 42s arrayed at predetermined spaces in the Y axis direction (longitudinal direction) as the capacitance elements. Each sensing electrode 42s is electrically connected to the control section 11 via a wiring section 46. In order to avoid electric field concentration, it is desirable that each sensing electrode 42s has a circle or rectangular flat shape and is formed to have tapered or round four corners as shown. Similarly, it is desirable that bent parts 47 of the wiring section 46 are formed not at a right angle but are bent stepwise, for example, by 45 degrees as shown.

Incidentally, one capacitance element 42s, the metal layer 43 arranged at the position corresponding to the capacitance element 42s, and the support 45 form one pressure-sensitive sensor 21.

The metal layer 43 is formed of metal foil such as copper foil fixed to inside of the protection cover 31 and is typically connected to the ground potential. The supports 45 are formed of a plurality of columnar materials elastically deformable in the X axis direction (shorter direction). The supports 45 are arranged between the metal layer 43 and the circuit board 42.

The self capacitance type electrostatic capacitance sensor is to measure proximity of the ground electrode such as a human and a metal plate by the electrostatic capacitance change in each sensing electrode 42s and is generally used for an electrostatic touch switch. The pressure-sensitive sensor may be considered as a capacitor that changes its shape by pressure. From the sensing electrodes 42s, it appears that the capacitance is increased when a grounded human body, a metal plate, or the like comes closer. The self capacitance type electrostatic capacitance sensor needs the number of wiring to the sensing electrodes of measuring the electrostatic capacitance change for individual detection. As the pressure-sensitive sensor, the capacitance change can be easily designed on the basis of an area, a distance, and a dielectric constant between the ground electrode (metal layer 43) and each sensing electrode (sensing electrode 42s).

As the pressure-sensitive sensor, it is available to use resistance change, a magnetic field change associated with metal deformation, a piezoelectric effect, or the like as well as to utilize the electrostatic capacitance change.

[Pressure-Sensitive Sensor+Proximity Sensor]

In addition to the above-described pressure-sensitive mechanisms 30 and 40, a proximity detection mechanism (proximity sensor 20) for detecting the user's finger (human body) proximity may be further arranged.

Figure 28:
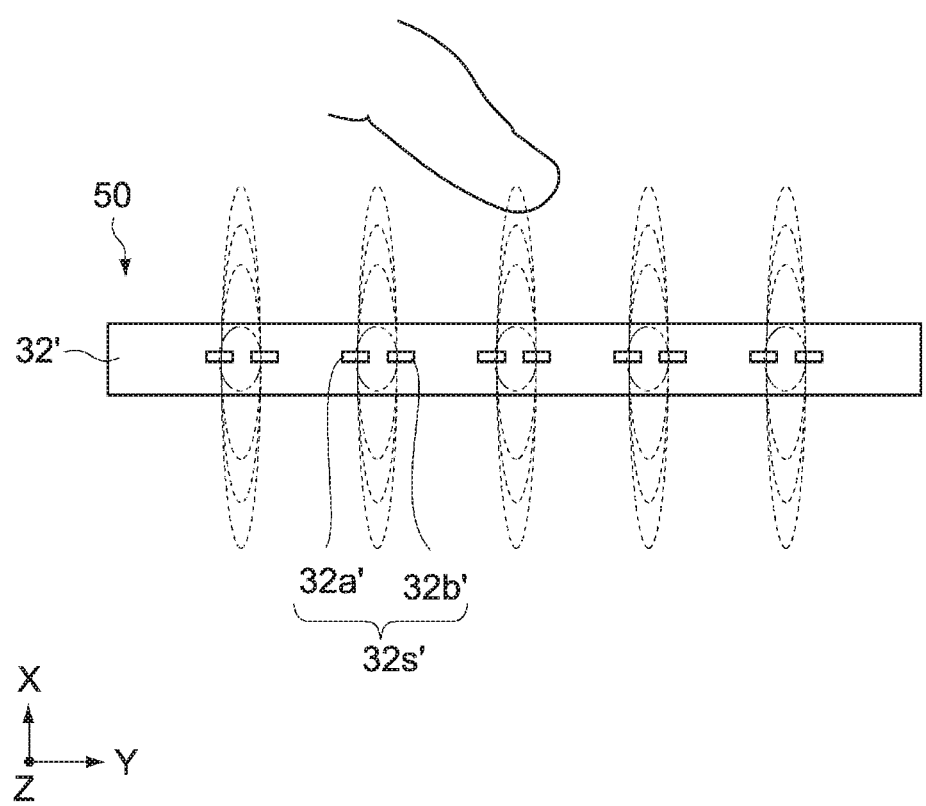
FIG. 28 is a view showing an example of a proximity detection mechanism.

FIG. 28 is a view showing an example of the proximity detection mechanism. A proximity detection mechanism 50 shown in FIG. 28 includes a circuit board 32'. The circuit board 32' has a structure similar to that of the circuit board 32 of the pressure-sensitive mechanism 30 in FIG. 23 and FIG. 24.

The circuit board 32' includes a plurality of capacitive elements 32s' arrayed at predetermined spaces in the Y axis direction (longitudinal direction) (also see FIG. 24). Each capacitive element 32s has a structure that each comb-like common electrode 32a' and each individual electrode 32b' are arranged by facing each other. Each capacitive element 32s is electrically connected to the control section 11 and is driven by receiving an input signal from the control section 11.

Incidentally, the proximity detection mechanism 50 shown in FIG. 28 has a structure that includes only the circuit board 32' by removing the first metal layer 33, the second metal layer 34, the first supports 35, and the second supports 36 from the pressure-sensitive mechanism 30 shown in FIGS. 23 and 24.

The proximity detection mechanism 50 (proximity sensor) is, for example, a mutual capacitance type sensor. When a pulse voltage is fed to each individual electrode 32b' (pulse electrode), an electric field (see dotted lines) is generated between each individual electrode 32b' and each common electrode 32a' (detection electrode).

In a case where the user's finger (human body) comes closer to the proximity detection mechanism 50, a part of the electric field is interrupted by the user's finger, the electric field detected by the common electrode 32a' is decreased, and the electrostatic capacitance between each common electrode 32a' and each individual electrode 32b' is decreased. In contrast, in a case where the closer user's finger gets away from the proximity detection mechanism 50, the electric field detected by the common electrode 32a' is increased and the electrostatic capacitance between each common electrode 32a' and each individual electrode 32b' is increased. By detecting the electrostatic capacitance change, the user's finger proximity is detected.

Figure 29:
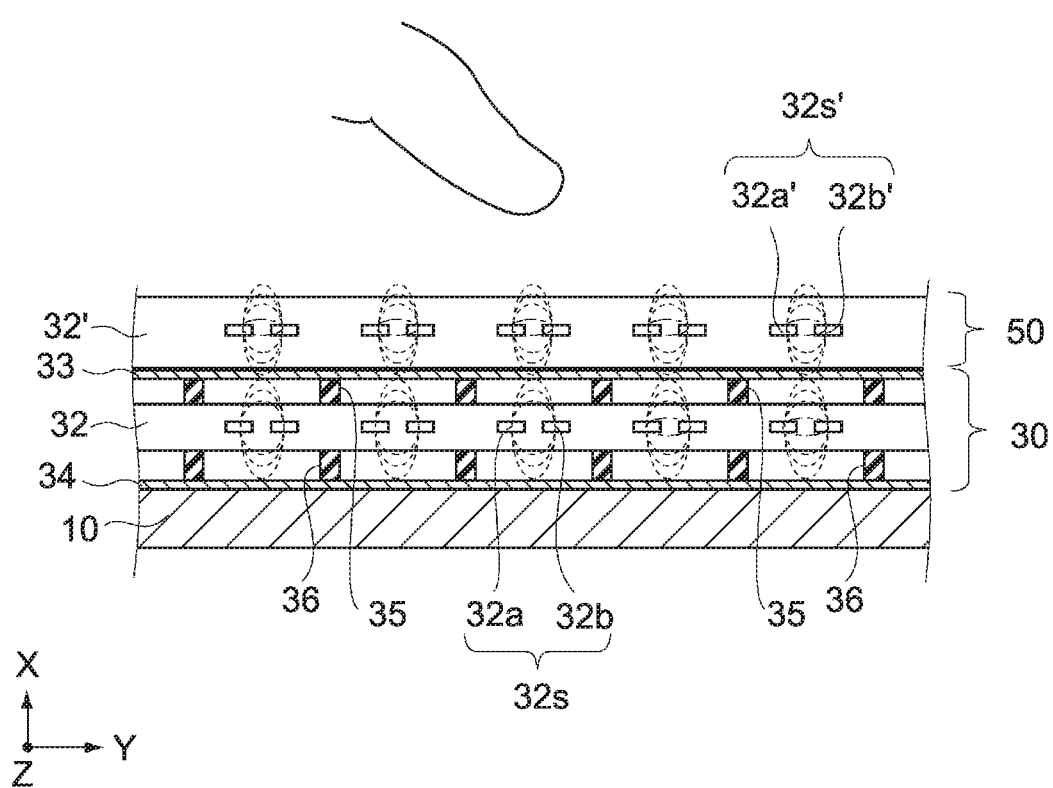
FIG. 29 is a drawing showing a state that the proximity detection mechanism is arranged above the pressure-sensitive mechanism.

FIG. 29 is a drawing showing a state that the proximity detection mechanism 50 is arranged above the pressure-sensitive mechanism 30. As shown in FIG. 29, in a case where the proximity detection mechanism 50 and the pressure-sensitive mechanism 30 are concurrently used, it is conceivable that the user's finger proximity (and position thereof) can be detected by the proximity detection mechanism 50 and pressure upon pressing can be detected by the pressure-sensitive mechanism 30.

However, as shown in FIG. 29, if the proximity detection mechanism 50 is arranged "directly" above the pressure-sensitive mechanism 30, there are problems as follows: In order to appropriately detect the user's finger proximity by the proximity detection mechanism 50, as shown in FIG. 28, the electric field generated between each individual electrode 32b' and each common electrode 32a' should be protruded outside (upper side) of the proximity detection mechanism 50 for a certain distance.

On the other hand, as shown in FIG. 29, if the proximity detection mechanism 50 is arranged directly above the pressure-sensitive mechanism 30, the electric field generated between each individual electrode 32b' and each common electrode 32a' in the proximity detection mechanism 50 may be influenced by the first metal layer 33 of the pressure-sensitive mechanism 30. Specifically, since the proximity detection mechanism 50 is closer to the pressure-sensitive mechanism 30, a part of the electric field generated between each individual electrode 32b' and each common electrode 32a' may be transferred to a first metal layer 33 side set to be the ground potential.

Accordingly, in the proximity detection mechanism 50, the electric field generated between each individual electrode 32b' and each common electrode 32a' is incapable of being protruded outside (upper side) of the proximity detection mechanism 50 for a certain distance. Therefore, the proximity detection mechanism 50 may not appropriately detect the user's finger proximity.

Moreover, in FIG. 29, also if the pressure-sensitive mechanism 40 (see FIG. 25 and FIG. 26) is used in place of the pressure-sensitive mechanism 30, there are similar problems. Specifically, a part of the electric field generated between each individual electrode 32b' and each common electrode 32a' may be transferred to a metal layer 43 side set to be the ground potential, the proximity detection mechanism 50 may not appropriately detect the user's finger proximity.

In order to solve such problems, a spacer (spacer may be actual substance or simply space) may be intervened between the proximity detection mechanism 50 and the pressure-sensitive mechanism 30 (or pressure-sensitive mechanism 40).

Figure 30:
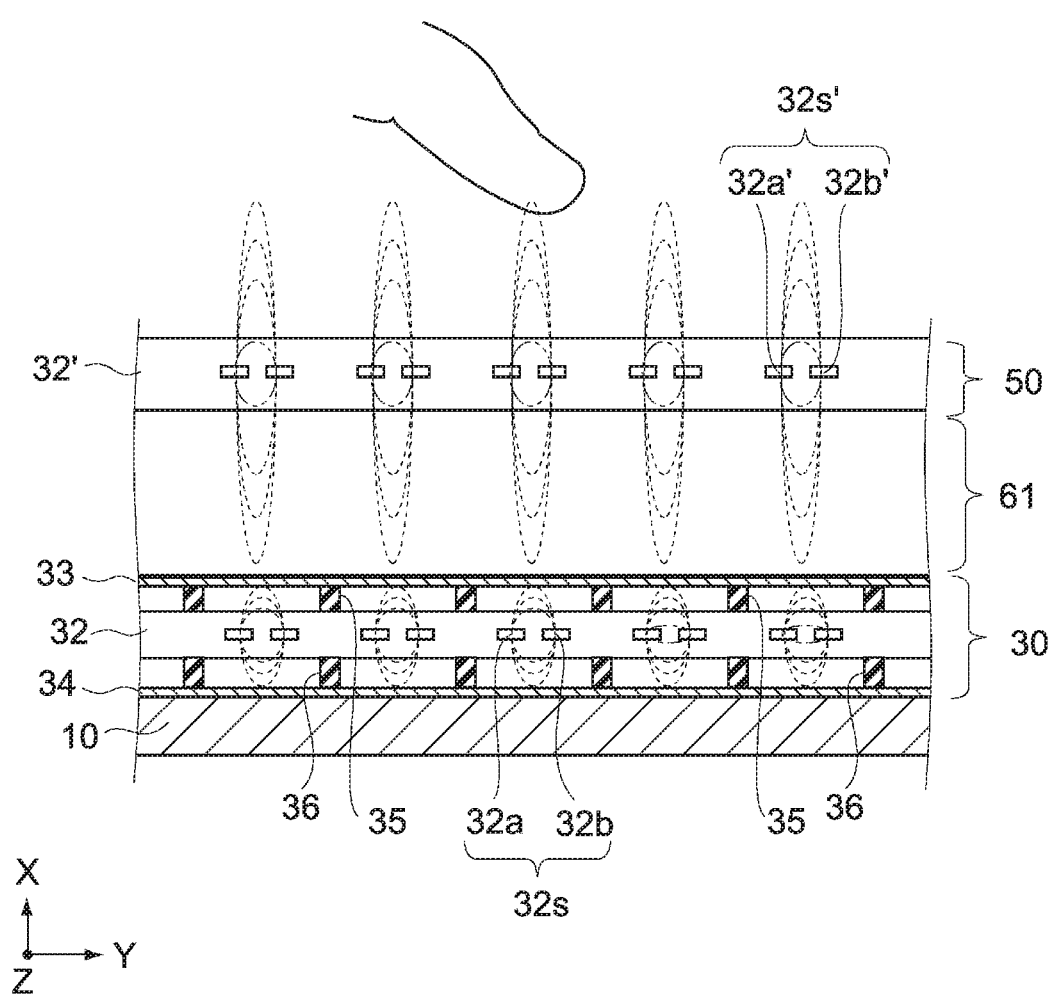
FIG. 30 is a view showing an example when a spacer is intervened between the proximity detection mechanism and the pressure-sensitive mechanism.

FIG. 30 is a view showing an example when the spacer is intervened between the proximity detection mechanism 50 and the pressure-sensitive mechanism 30. FIG. 30 shows an example in a case where an insulating material such as resin and SiO$_2$ is used as a material of a spacer 61.

As shown in FIG. 30, by intervening the spacer 61 between the proximity detection mechanism 50 and the pressure-sensitive mechanism 30, a distance between each individual electrode 32b' and each common electrode 32a' of the proximity detection mechanism 50 and the first metal layer 33 of the pressure-sensitive mechanism 30 can be increased.

Thus, the electric field generated between each individual electrode 32b' and each common electrode 32a' is prevented from being influenced by the first metal layer 33 of the pressure-sensitive mechanism 30. Accordingly, the proximity detection mechanism 50 can appropriately detect the user's finger proximity.

Figure 31:
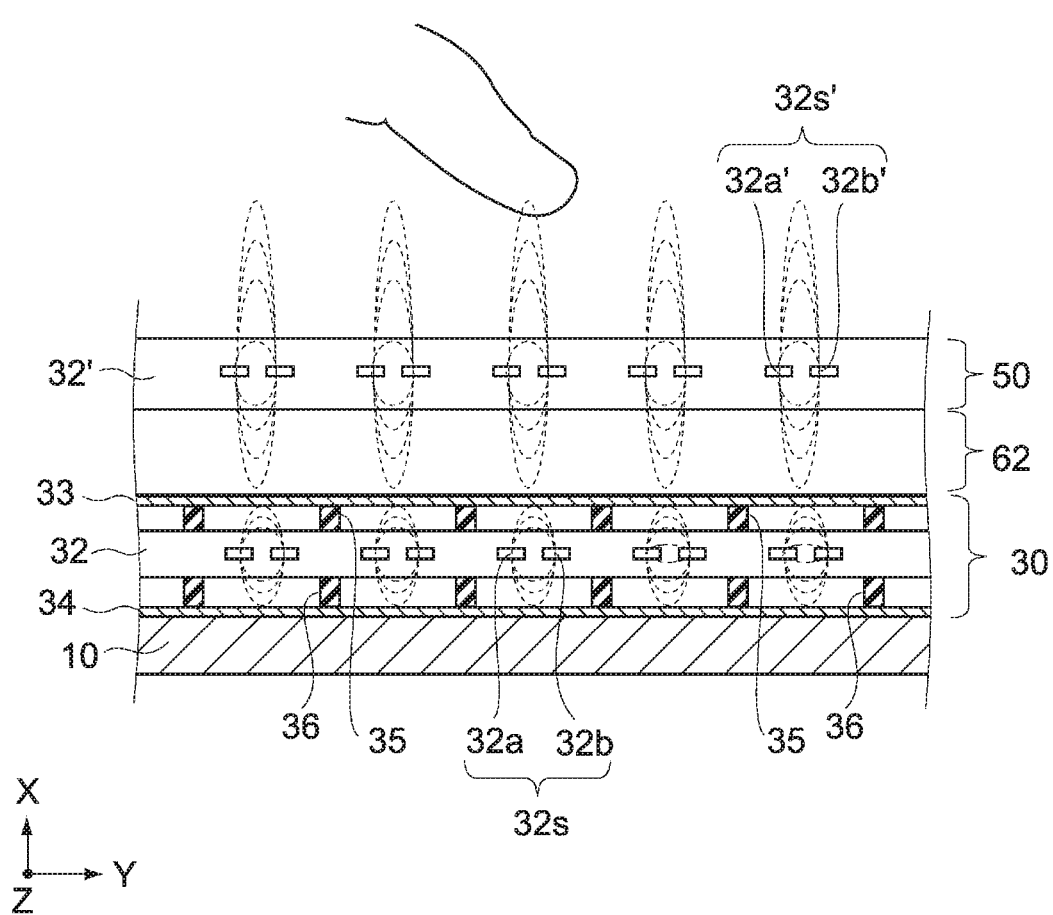
FIG. 31 is a view showing an example when a spacer is intervened between the proximity detection mechanism and the pressure-sensitive mechanism.

FIG. 31 is a view showing another example when the spacer is intervened between the proximity detection mechanism 50 and the pressure-sensitive mechanism 30. FIG. 31 shows an example when a high dielectric constant material is used as a material of a spacer 62.

In a case where the high dielectric constant material is used as the material of the spacer 62, the electric field generated between each individual electrode 32b' and each common electrode 32a' of the proximity detection mechanism 50 is contracted within the spacer 62 (up and down directions: X axis direction).

Accordingly, while the distance between each individual electrode 32b' and each common electrode 32a' of the proximity detection mechanism 50 and the first metal layer 33 of the pressure-sensitive mechanism 30 can be shorter than that in the example shown in FIG. 30 (i.e., thinning is possible), the proximity detection mechanism 50 can appropriately detect the user's finger proximity.

Incidentally, FIG. 30 and FIG. 31 show the case that the pressure-sensitive mechanism 30 is used as the pressure-sensitive mechanism, but the similar effect is provided if the pressure-sensitive mechanism 40 is used as the pressure-sensitive mechanism (as electric field is prevented from being influenced by metal layer 43).

[Folding Type Housing]

Figure 27:
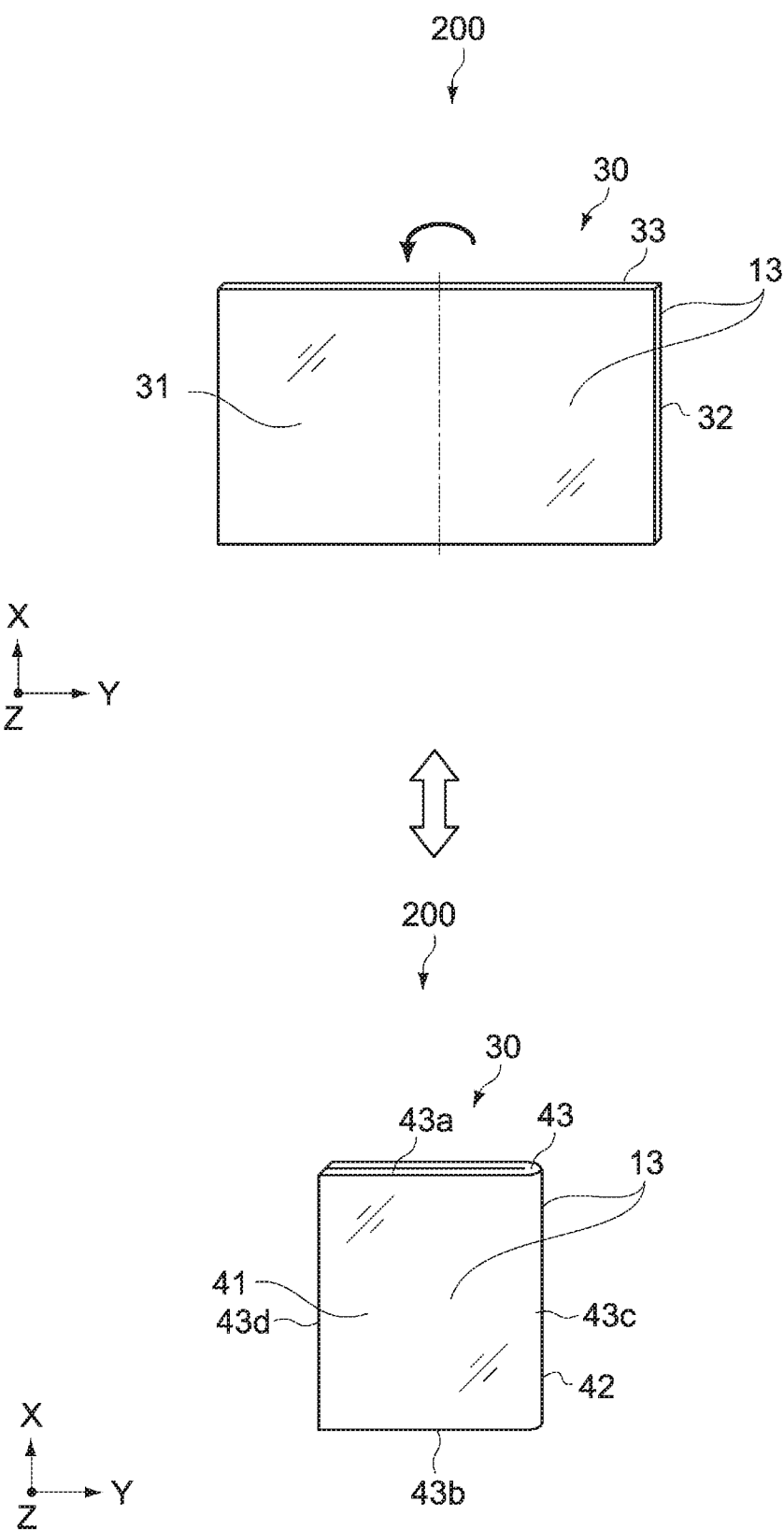
FIG. 27 is a view showing a smartphone including a folding type housing.

The present technology is applicable to a smartphone 200 including a folding type housing 30. FIG. 27 is a view showing the smartphone 200 including the folding type housing 30. At an upper side of FIG. 27, a state of the housing 30 is shown when the housing 30 is in an expanded status. On the other hand, at a lower side of FIG. 27, a state of the housing 30 is shown when the housing 30 is in a folded status.

As shown in FIG. 27, in the smartphone 200, a shape of the housing 30 is changeable between the expanded status and the folded status. Although the housing 30 is double-foldable in the example shown in FIG. 27, the housing 30 may have a structure of triplefoldable or more. In addition, in the example shown in FIG. 27, it describes that a folding portion (see dashed line) is determined in advance, but the folding portion may be indefinite (i.e., anywhere foldable).

In the housing 30 in the expanded status, the display sections 13 are arranged entirely over the front surface 31 and the rear surface 32. In addition, in the housing 30 in the expanded status, the proximity sensors 20 are arranged entirely over the display sections 13 of the front surface 31 and the rear surface 32. Note that, in this example, although in the housing 30 in the expanded status, no display section 13 and no proximity sensor 20 are arranged on a side circumference surface 33, the display section 13 and the proximity sensor 20 may be arranged at the position.

In the expanded status, the folding portion (see dashed line) is set at the center position in the Y axis direction along the X axis direction. On the folding portion, the plurality of pressure-sensitive sensors 21 are arranged at predetermined spaces along the X axis direction.

It is assumed that the housing 30 in the expanded status is folded as shown by a black arrow in FIG. 27 and becomes in the folded status. In this case, a front surface 41 of the housing 30 in the folded status corresponds to a left half of the front surface 31 of the housing 30 in the expanded status and the rear surface 42 of the housing 30 in the folded status corresponds to a right half of the front surface 31 of the housing 30 in the expanded status. In addition, a right side surface 43c of the housing 30 in the folded status corresponds to a vicinity of the center of the front surface 1 of the housing 10 in the expanded status.

In the right side surface 43c (folding portion: pressure-sensitive sensors 21 are arranged) of the housing 30 in the folded status, the above-described setting processing of the operation area 5, the identification processing of the holding status or the operation status, and the processing in the operation status are executed. Note that also in an upper surface 43a, a lower surface 43b, and a left side surface 43d of the housing 30 in the folded status, the above-descried various processing may be executed (in this case, pressure-sensitive sensors 21 are arranged on corresponding portions).

[Others]

In the above description, the position in which the operation area 5 is set is the side circumference surface 3 or 43 (sub-surface) of the housing 10 or 30. On the other hand, the position in which the operation area 5 is set may be a rear surface 2, 32, or 42 (sub-surface) of the housing 10 or 30. In this case, the pressure-sensitive sensors 21 are arranged with respect to the rear surface 2, 32, or 42 of the housing 10 or 30.

In the above description, the position in which the operation area 5 is set is determined in accordance with the posture and the holding pattern. On the other hand, the position in which the operation area 5 is set may be determined in advance at a certain place regardless of the posture and the holding pattern. In this case, the pressure-sensitive sensors 21 are arranged only on the certain place.

In the above description, the operation area 5 is set to any of the portions in which the display section 13 is arranged. On the other hand, the operation area 5 may be set to the portion in which no display section 13 is arranged.

For example, in FIG. 1, the display section 13 on the side circumference surface 3 may be omitted and the operation area 5 may be set to the side circumference surface 3. Note that, in this case, the GUI 6 is not arranged at the position corresponding to the operation area 5 (i.e., GUI 6 is not always necessary). In addition, the operation areas 5 may be set to both portions in which the display section 13 is arranged and no display section 13 is arranged.

In the above description, the number of the pressure-sensitive sensors 21 is plural, but the number of the pressure-sensitive sensor 21 may be one.

In the above description, the example of the information processing apparatus is the smartphone 100 or 200, but the information processing apparatus is not limited thereto. For example, the information processing apparatus may be a tablet PC (personal computer), a mobile game machine, a mobile music player, a wearable apparatus, a virtual reality apparatus, or the like. Note that various processing in the above-described control section 11 may be executed by the control section 11 of the server apparatus on the network (information processing apparatus).

The present technology may also have the following structures.

(1) An information processing apparatus, including:
a housing having a front surface and a sub-surface including an operation area, the housing being capable of being held by a user;
a display section arranged on the front surface;
a pressure-sensitive sensor that detects a pressure value with respect to the sub-surface; and
a control section that identifies a status that the operation area is operated by the user and a status that the operation area is held by the user on a basis of the pressure value and executes predetermined processing on a basis of an operation by the user with respect to the operation area in a case where the status is determined that the operation area is operated.

(2) The information processing apparatus according to (1), in which
the control section determines that the operation area is operated by the user in a case where it satisfies a condition that the pressure value continues to take a value within a predetermined range within a predetermined time.

(3) The information processing apparatus according to (2), in which
the control section determines that the operation area is held by the user in a case where the condition is not satisfied.

(4) The information processing apparatus according to (1), including:
a plurality of the pressure-sensitive sensors, in which
the control section identifies a status that the operation area is operated by the user and the operation area is held by the user on a basis of a second pressure value detected by a second pressure-sensitive sensor adjacent to a first pressure-sensitive sensor in a case where it satisfies a condition that a first pressure value detected by the first pressure-sensitive sensor of the plurality of pressure-sensitive sensors continues to take a value within a predetermined range within a predetermined time.

(5) The information processing apparatus according to (4), in which
the control section determines that the operation area is in a status operated by the user in a case where the second pressure value is less than a predetermined threshold.

(6) The information processing apparatus according to (4) or (5), in which
the control section determines that the operation area is in a status held by the user in a case where the second pressure value is a predetermined threshold or more.

(7) The information processing apparatus according to any one of (1) to (6), in which
the control section determines a position in which the operation area is set in the sub-surface.

(8) The information processing apparatus according to (7), further including:
a motion sensor that detects a posture of the housing, in which
the control section determines a position in which the operation area is set on a basis of the detected posture of the housing.

(9) The information processing apparatus according to (7) or (8), in which
the control section determines a holding pattern of the housing held by the user on a basis of the pressure value and determines a position in which the operation area is set on a basis of the holding pattern.

(10) The information processing apparatus according to (8), in which
when the posture of the housing is changed, the control section newly determines a position in which the operation area is set at the sub-surface on a basis of a change in the posture.

(11) The information processing apparatus according to (9), in which
when the holding pattern is changed, the control section newly determines a position in which the operation area is set at the sub-surface on a basis of a change in the holding pattern.

(12) The information processing apparatus according to any one of (7) to (11), in which
when the operation area is set at the sub-surface, the control section causes a guide showing a position in which the operation area is set to be displayed on the display section at the front surface.

(13) The information processing apparatus according to any one of (1) to (12), in which
the display sections are arranged on the front surface and the sub-surface, and
the control section causes a GUI (Graphical User Interface) to be displayed at a position corresponding to the operation area on the sub-surface of the display section.

(14) The information processing apparatus according to any one of (1) to (13), further including:
a proximity sensor arranged on the sub-surface that detects a user contact position, in which
in a case where the status is determined that the operation area is operated by the user, the control section executes predetermined processing on a basis of the detected contact position.

(15) The information processing apparatus according to any one of (1) to (14), in which in a case where the status is determined that the operation area is operated by the user, the control section executes predetermined processing on a basis of the pressure value.

(16) The information processing apparatus according to any one of (1) to (15), in which the housing has a shape changeable between an expanded status and a folded status.

(17) An information processing method, including:

identifying, on a basis of a pressure value with respect to a sub-surface of a housing having a front surface including a display section and the sub-surface including an operation area, the housing being capable of being held by a user, a status that the operation area is operated by the user and a status that the operation area is held by the user; and executing predetermined processing on a basis of an operation by the user with respect to the operation area in a case where the status is determined that the operation area is operated.

(18) A program executed by a computer, the program causing the computer to do steps of:

identifying, on a basis of a pressure value with respect to a sub-surface of a housing having a front surface including a display section and the sub-surface including an operation area, the housing being capable of being held by a user, a status that the operation area is operated by the user and a status that the operation area is held by the user; and executing predetermined processing on a basis of an operation by the user with respect to the operation area in a case where the status is determined that the operation area is operated.

REFERENCE SIGNS LIST 1, 31, 41 front surface
2, 32, 42 rear surface
3, 33, 43 side circumference surface
5 operation area
6 GUI
10, 30 housing
11 control section
13 display section
19 motion sensor
20 proximity sensor
21 pressure-sensitive sensor
100, 200 smartphone

The invention claimed is:

1. An information processing apparatus, comprising:
a housing having a front surface and a sub-surface including an operation area, the housing being capable of being held by a user;
a display section arranged on the front surface;
a pressure-sensitive sensor that detects a pressure value with respect to the sub-surface; and
a control section that identifies a status that the operation area is operated by the user and a status that the operation area is held by the user on a basis of the pressure value and executes predetermined processing on a basis of an operation by the user with respect to the operation area in a case where the status is determined that the operation area is operated,
wherein the control section determines a position in which the operation area is set in the sub-surface, and
wherein when the operation area is set at the sub-surface, the control section causes a guide showing a position in which the operation area is set to be displayed on the display section at the front surface.

2. The information processing apparatus according to claim 1, wherein the control section determines that the operation area is operated by the user in a case where it satisfies a condition that the pressure value continues to take a value within a predetermined range within a predetermined time.

3. The information processing apparatus according to claim 2, wherein the control section determines that the operation area is held by the user in a case where the condition is not satisfied.

4. The information processing apparatus according to claim 1, comprising:

a plurality of the pressure-sensitive sensors, wherein
the control section identifies a status that the operation area is operated by the user and the operation area is held by the user on a basis of a second pressure value detected by a second pressure-sensitive sensor adjacent to a first pressure-sensitive sensor in a case where it satisfies a condition that a first pressure value detected by the first pressure-sensitive sensor of the plurality of pressure-sensitive sensors continues to take a value within a predetermined range within a predetermined time.

5. The information processing apparatus according to claim 4, wherein the control section determines that the operation area is in a status operated by the user in a case where the second pressure value is less than a predetermined threshold.

6. The information processing apparatus according to claim 4, wherein the control section determines that the operation area is in a status held by the user in a case where the second pressure value is a predetermined threshold or more.

7. The information processing apparatus according to claim 1, further comprising:

a motion sensor that detects a posture of the housing, wherein
the control section determines a position in which the operation area is set on a basis of the detected posture of the housing.

8. The information processing apparatus according to claim 7, wherein when the posture of the housing is changed, the control section newly determines a position in which the operation area is set at the sub-surface on a basis of a change in the posture.

9. The information processing apparatus according to claim 1, wherein the control section determines a holding pattern of the housing held by the user on a basis of the pressure value and determines a position in which the operation area is set on a basis of the holding pattern.

10. The information processing apparatus according to claim 9, wherein when the holding pattern is changed, the control section newly determines a position in which the operation area is set at the sub-surface on a basis of a change in the holding pattern.

11. The information processing apparatus according to claim 1, wherein the display is arranged on the front surface and the sub-surface, and the control section causes a GUI (Graphical User Interface) to be displayed at a position corresponding to the operation area on the sub-surface of the display section.

12. The information processing apparatus according to claim 1, further comprising:

a proximity sensor arranged on the sub-surface that detects a user contact position, wherein in a case where the status is determined that the operation area is operated by the user, the control section executes predetermined processing on a basis of the detected contact position.

13. The information processing apparatus according to claim 1, wherein in a case where the status is determined that the operation area is operated by the user, the control section executes predetermined processing on a basis of the pressure value.

14. The information processing apparatus according to claim 1, wherein the housing has a shape changeable between an expanded status and a folded status.

15. An information processing method, comprising:

identifying, on a basis of a pressure value with respect to a sub-surface of a housing having a front surface including a display section and the sub-surface including an operation area, the housing being capable of being held by a user, a status that the operation area is operated by the user and a status that the operation area is held by the user; and executing predetermined processing on a basis of an operation by the user with respect to the operation area in a case where the status is determined that the operation area is operated;

determining a position in which the operation area is set in the sub-surface; and when the operation area is set at the sub-surface, causing a guide showing a position in which the operation area is set to be displayed on the display section at the front surface.

16. A non-transitory computer-readable medium, having computer executable instructions embodied thereon, wherein when executed by a computer, the computer executable instructions causing the computer to do steps of:

identifying, on a basis of a pressure value with respect to a sub-surface of a housing having a front surface including a display section and the sub-surface including an operation area, the housing being capable of being held by a user, a status that the operation area is operated by the user and a status that the operation area is held by the user; and executing predetermined processing on a basis of an operation by the user with respect to the operation area in a case where the status is determined that the operation area is operated;

determining a position in which the operation area is set in the sub-surface; and when the operation area is set at the sub-surface, causing a guide showing a position in which the operation area is set to be displayed on the display section at the front surface.

* * * * *